(12) United States Patent
Ye et al.

(10) Patent No.: US 12,703,667 B2
(45) Date of Patent: Aug. 11, 2026

(54) HIGH-ENTROPY CARBIDE CERAMIC AND RARE EARTH-CONTAINING HIGH-ENTROPY CARBIDE CERAMIC, FIBERS AND PRECURSORS THEREOF, AND METHODS FOR PREPARING THE SAME

(71) Applicant: INSTITUTE OF CHEMISTRY, CHINESE ACADEMY OF SCIENCES, Beijing (CN)

(72) Inventors: Li Ye, Beijing (CN); Tong Zhao, Beijing (CN); Yanan Sun, Beijing (CN); Weijian Han, Beijing (CN); Fenghua Chen, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 947 days.

(21) Appl. No.: 17/801,880

(22) PCT Filed: Nov. 11, 2020

(86) PCT No.: PCT/CN2020/127989
§ 371 (c)(1),
(2) Date: Aug. 24, 2022

(87) PCT Pub. No.: WO2021/179654
PCT Pub. Date: Sep. 16, 2021

(65) Prior Publication Data

US 2023/0088418 A1 Mar. 23, 2023

(30) Foreign Application Priority Data

Mar. 12, 2020 (CN) ......................... 202010171717.8
Mar. 12, 2020 (CN) ......................... 202010172462.7
Apr. 9, 2020 (CN) ......................... 202010273213.7

(51) Int. Cl.
*C04B 35/56* (2006.01)
*C04B 35/622* (2006.01)
(Continued)

(52) U.S. Cl.
CPC ...... *C04B 35/5626* (2013.01); *C04B 35/5622* (2013.01); *C04B 35/62277* (2013.01);
(Continued)

(58) Field of Classification Search
CPC ............ C04B 35/5626; C04B 35/5622; C04B 35/6269; C04B 35/5607; C04B 2235/441; C04B 2235/6562; D10B 2101/14
See application file for complete search history.

(56) References Cited

FOREIGN PATENT DOCUMENTS

CN 104988604 A 10/2015
CN 110104648 A * 8/2019 ............. C01B 32/90
(Continued)

OTHER PUBLICATIONS

CN110104648A machine translation (Year: 2019).*
(Continued)

*Primary Examiner* — Cameron K Miller
(74) *Attorney, Agent, or Firm* — HAUPTMAN HAM, LLP

(57) ABSTRACT

Provided are a high-entropy carbide ceramic, a rare earth-containing high-entropy carbide ceramic, fibers thereof, precursors thereof, and preparation methods thereof. The precursor includes at least four elements selected from Ti, Zr, Hf, V, Nb, Ta, Mo, and W, with each metal element accounting for 5-35% of the total molar quantity of metal elements in the precursor. The rare earth-containing high-entropy carbide ceramic precursor includes at least four transition metal elements and at least one rare-earth metal element. The high-entropy ceramic is a single-crystal-phase high-performance ceramic prepared from the precursor, with
(Continued)

(HfMoTaWZr)$C_5$ 30 40 50 60 70 80 each element being homogenously distributed at molecular level. The method for preparing the high-entropy ceramic fiber includes uniformly mixing high-entropy carbide ceramic precursor containing target metal elements with spinning aid and solvent to prepare a spinnable precursor solution, followed by spinning, pyrolyzation, and high-temperature solid solution to prepare the high-entropy carbide ceramic fiber.

8 Claims, 9 Drawing Sheets

(51) Int. Cl.

| | |
|---|---|
| ***C04B 35/626*** | (2006.01) |
| ***C04B 35/634*** | (2006.01) |
| ***C04B 35/64*** | (2006.01) |
| ***C08G 83/00*** | (2006.01) |
| ***D01D 1/02*** | (2006.01) |
| ***D01D 5/00*** | (2006.01) |
| ***D01D 5/04*** | (2006.01) |
| ***D01D 5/18*** | (2006.01) |
| ***D01F 9/10*** | (2006.01) |

(52) U.S. Cl.

CPC ...... *C04B 35/6264* (2013.01); *C04B 35/6269* (2013.01); *C04B 35/6342* (2013.01); *C04B 35/63424* (2013.01); *C04B 35/63444* (2013.01); *C04B 35/64* (2013.01); *C08G 83/001* (2013.01); *D01D 1/02* (2013.01); *D01D 5/0038* (2013.01); *D01D 5/04* (2013.01); *D01D 5/18* (2013.01); *D01F 9/10* (2013.01); *C04B 2235/3843* (2013.01); *C04B 2235/3847* (2013.01); *C04B 2235/48* (2013.01); *C04B 2235/6567* (2013.01); *C04B 2235/6581* (2013.01); *D10B 2101/14* (2013.01)

(56) References Cited

FOREIGN PATENT DOCUMENTS

| | | |
|---|---|---|
| CN | 110606740 A | 12/2019 |
| CN | 110773192 A | 2/2020 |

OTHER PUBLICATIONS

International Search Report issued in International Application No. PCT/CN2020/127989; mailed Jan. 27, 2021; 8 pgs.

First Office Action issued in Chinese Application No. 202010171717.8; mailed Dec. 29, 2020; 10 pgs.

First Office Action issued in Chinese Application No. 202010273213.7; mailed Jan. 13, 2021; 17 pgs.

Lu, Yan, et al.; Synthesis, Characterization and Microstructure of Tantalum Carbide-Based Ceramics by Liquid Polymeric Precursor Method; Ceramics International; vol. 41, No. 9; Jun. 17, 2015; pp. 12475-12479.

Sun, Yanan, et al; Transformation of metallic polymer precursor into nanosized HfTaC2 ceramics; Ceramics International; vol. 46, No. 5; Nov. 9, 2019; pp. 6022-6028.

Ye, Beilin, et al; High-temperature oxidation behavior of (Hf0.2Zr0.2Ta0.2Nb0.2Ti0.2) C high-entropy ceramics in air; Journal of the American Ceramic; Jul. 30, 2019, vol. 103, pp. 500-507.

Wei, Xiao-Feng, et al; High entropy carbide ceramics from different starting materials; Journal of the European Ceramic Society, Apr. 4, 2019, vol. 39, pp. 2989-2994.

Sarker, Pranab, et al; High-entropy high-hardness metal carbides discovered by entropy descriptors; Nature Communications; 2018, vol. 9. No. 4980, pp. 4980-4988.

Castle, Elinor, et al; Processing and Properties of High-Entropy Ultra-High Temperature Carbides; Sciencetific Reports; Jun. 5, 2018; vol. 8; No. 8609; 12 pgs.

Feng, Lun, et al; Synthesis of single-phase high-entropy carbide powders; Scripta Materialia;162 (2019); Nov. 7, 2018; pp. 90-93.

* cited by examiner

HIGH-ENTROPY CARBIDE CERAMIC AND RARE EARTH-CONTAINING HIGH-ENTROPY CARBIDE CERAMIC, FIBERS AND PRECURSORS THEREOF, AND METHODS FOR PREPARING THE SAME

RELATED APPLICATIONS

The present application is a U.S. National Phase of International Application Number PCT/CN2020/127989 filed Nov. 11, 2020, and claims priority to Chinese Application Numbers CN 202010172462.7, filed Mar. 12, 2020, CN 202010171717.8, filed Mar. 12, 2020, and CN 202010273213.7, filed Apr. 9, 2020.

FIELD OF THE INVENTION

The present invention belongs to the field of high-entropy ceramics, and particularly relates to a high-entropy carbide ceramic, a rare earth-containing high-entropy carbide ceramic, fibers and precursors thereof, and methods for preparing the same.

BACKGROUND OF THE INVENTION

High-entropy ceramics are a new type of ceramics that have emerged in recent years. The concept of high-entropy ceramics comes from high-entropy alloys, which usually refer to single-phase solid solutions formed by five or more equimolar (or near-equimolar) metal compounds. High-entropy ceramics not only enrich the types of ceramics, but also endow materials with great space for performance adjustment due to a novel "high-entropy effect" brought by the synergy of multiple compositions.

Research on high-entropy carbide ceramics is currently mainly focused on transition metal carbides of group IVB and VB. These carbides have rock-salt structure and need a very high sintering temperature, which is often above 2000° C., due to their strong covalent bonding and high melting point. In 2018, Castle et al. (Scientific Reports 2018, 8, 8609-8620) first reported preparation of bulk (Hf—Ta—Zr—Ti)C and (Hf—Ta—Zr—Nb)C four-element carbide ceramics by spark plasma sintering of carbide powders at 2300° C. and 16 MPa. Only the (Hf—Ta—Zr—Nb)C system formed a single phase solid-solution ceramic, and its hardness (36.1±1.6 GPa) is much higher than that of any monocarbide (the hardest monocarbide HfC has a hardness of 31.5±1.3 GPa). After that, Sarker et al. (Nature Communications 2018, 9, 4980-4988) propose a descriptor, entropy forming ability (EFA), for addressing synthesizability of high-entropy carbides from first principles. The EFA of fifty-six five-metal high-entropy carbides forming from carbides of eight metals, Ti, Zr, Hf, V, Nb, Ta, Mo, and W, were calculated. To validate the predictions, the nine chosen carbides are experimentally synthesized and characterized. Experimental results were proved to be consistent with theoretical predictions, i.e., the higher the EFA is, the easier it is to form a solid-solution ceramic, which provided an important theoretical basis for design and preparation of high-entropy carbide ceramics. Chu Yanhui et al. from South China University of Technology (Journal of the American Ceramic Society 2019, 103, 500-507) studied oxidation of $(Hf_{0.2}Zr_{0.2}Ta_{0.2}Nb_{0.2}Ti_{0.2})C$ high-entropy ceramics at 1300-1500° C., and results showed that the high-entropy ceramics had good oxidation resistance at high temperature and mainly formed solid solutions of various oxides after oxidation.

Due to harsh preparation conditions and newness of the field, there are currently very few reports on high-entropy carbide ceramics. Existing methods for preparing high-entropy carbide ceramics mainly include carbide powder reactive sintering, element reactive sintering, and oxide reduction sintering. Sarker et al. (Nature Communications 2018, 9, 4980-4988) prepared nine five-element high-entropy carbide ceramics including $MoNbTaVWC_5$, $HfNbTaTiZrC_5$, $HfNbTaTiVC_5$, $HfMoVWZrC_5$, $HfMoTiWZrC_5$, $NbTaTiVWC_5$, $HfNbTaTiWC_5$, $HfTaTiWZrC_5$, and $HfMoTaWZrC_5$ by ball milling carbide powders followed by reaction sintering though SPS at high temperature and high pressure (2200° C., 30 MPa). Results showed that, under such conditions, only the first six systems having relatively high entropy forming ability could form a single phase solid solution, with three ($HfNbTaTiZrC_5$, $HfNbTaTiVC_5$, and $HffaTiWZrC_5$) of the formed six solid solutions each containing a small amount of oxides, and the latter three systems having relatively low entropy forming ability could not form a single phase carbide solid solution. Lun Feng et al. (Scripta Materialia, 2019, 162, 90-93) prepared $HfZrTiTaNbC_5$ ceramic by ball milling metal oxides and carbon black, to obtain a mixture, followed by sieving and pressing the mixture into disks, which were then subjected to carbothermal reduction at 1600° C., and then heated at higher temperatures to obtained solid solution. The study found that the solid solution formation required heating to 2000° C. and kept for 1.5 hours. Zhang Guojun, from Donghua University (Journal of the European Ceramic Society, 2019, 39, 2989-2994), prepared $(Ti_{0.2}Zr_{0.2}Nb_{0.2}Ta_{0.2}W_{0.2})C$ high-entropy ceramic (preparation conditions: 2000° C., 50 MPa, 5 minutes) by three methods, namely carbide powder reactive sintering, element reactive sintering, and oxide reduction sintering. Although single phase five-metal solid solution were obtained by the three processes, the sample obtained by carbides had a relatively low density (95.7%) due to the high oxygen content of the powder, and the XRD pattern also showed presence of a small impurity peak. Because of the coarse texture of the metal powders, the sample obtained by element reactive sintering exhibited a very inhomogeneous distribution of elements. The use of finer metal powders may solve this problem, but may bring new problems such as spontaneous combustion of the metal powder and higher oxygen content therein. Although the product obtained by oxides reduction sintering is single phase, the EDS image showed obvious segregation of Zr, due to the high reaction temperature of $ZrO_2$ and C.

As mentioned above, the several traditional methods for preparing high-entropy carbide ceramics from inorganic powders usually require high temperatures of over 2000° C. and high pressures, and the prepared ceramics often exhibit inhomogeneous distribution of elements due to incomplete solutionizing. In addition, these traditional methods can only be used to prepare ceramic blocks or ceramic powders. This limits the application of high-entropy ceramics in the field of ceramic matrix composites and fibers.

Chinese patent application No. 201911080643.0 discloses a method of preparing a carbon-supported high-entropy single-atom catalyst, in which a soluble metal salt (five to fifteen selected from metal elements Sc, Ti, V, Cr, Mn, Fe, Co, Ni, Cu, Zn, Mo, Y, Zr, Lu, and Ru), a soluble carbon source (glucose), water, and ethanol were mixed to obtain a mixed aqueous solution, which was then ultrasonically dispersed, then dried and precipitated at 25-80° C. to obtain a catalyst precursor; after that, the catalyst precursor was calcined at 600-800° C. under an inert atmosphere and vacuum environment, cooled, and then ground to obtain the carbon-supported high-entropy metal single-atom catalyst. The rare earth elements in the obtained catalyst exist as high-entropy metal alloys, which have properties completely different from those of high-entropy ceramics and therefore cannot be directly used in the field of high-entropy ceramics.

Chinese patent application No. 201910858887.0 discloses a high-entropy rare earth hafnate ceramic material and a preparation method thereof. The chemical formula of the high-entropy rare earth hafnate is $(RE'_{0.2}RE''_{0.2}Ho_{0.2}Er_{0.2}Tm_{0.2})_4Hf_3O_{12}$, where RE' is La or Yb, and RE" is Gd or Lu. The specific preparation process is as follows: lanthanum oxide powders, gadolinium oxide powders, holmium oxide powders, erbium oxide powders, thulium oxide powders, ytterbium oxide powders, lutetium oxide powders, and hafnium oxide powders, as raw materials, were mixed by wet process, sintered under air atmosphere without pressure, and then sintered in a hot press furnace with protective atmosphere, to obtain the high-entropy rare earth hafnate material. The rare earth elements in the high-entropy ceramic prepared by the method exist in the form of oxides.

So far, there have not been any research reports on high-entropy carbide ceramic fibers and rare-earth metal-containing high-entropy carbide ceramics. The introduction of rare-earth metals however can not only enrich the types of high-entropy ceramics, but also endow ceramics with certain functionality.

SUMMARY OF THE INVENTION

The technical problem to be solved by the present invention is to overcome the deficiencies of the existing technologies to provide a high-entropy carbide ceramic, a rare earth-containing high-entropy carbide ceramic, fibers and precursors thereof, and methods for preparing the same.

The present invention provides a high-entropy carbide ceramic precursor. The precursor includes at least four elements selected from Ti, Zr, Hf, V, Nb, Ta, Mo, and W, each with a molar percentage 5-35% of the total molar quantity of metal elements in the precursor. The precursor is soluble in methanol, ethanol, isopropanol, n-propanol, n-butanol, isobutanol, ethylene glycol methyl ether, or ethylene glycol ethyl ether.

In a further technical solution of the present invention, molar quantity of each metal element in the precursor are equal, and the precursor has a viscosity change of less than 6% over 12 months.

In the above technical solution, the precursor provided by the present invention is a soluble polymer. Due to special treatment in its preparation process, the precursor not only has the processability of a polymer so that it can be used for the preparation of ceramic matrix composite materials, coatings, fibers, and the like, but also has good storage performance, exhibiting a relatively small viscosity change during long-term storage at room temperature. The high-entropy carbide ceramic precursor is prepared by cohydrolysis of metal alkoxides, which can realize uniform distribution of elements at a molecular level and can form a polymer soluble in a plurality of conventional solvents, providing the precursor with processability and making it suitable for popularization and use.

The present invention further provides a rare earth-containing high-entropy carbide ceramic precursor. The precursor includes at least four transition metal elements and at least one rare-earth metal element. The precursor is soluble in one or more selected from methanol, ethanol, isopropanol, n-propanol, n-butanol, isobutanol, ethylene glycol methyl ether, and ethylene glycol ethyl ether.

In a further technical solution of the present invention, the precursor includes at least four elements selected from Ti, Zr, Hf, V, Nb, Ta, Mo, and W, and at least one element selected from Y and La. Each metal with a molar percentage 5-35% of the total molar quantity of metal elements contained therein.

In a further technical solution of the present invention, molar quantity of each metal element in the precursor are equal, and the precursor has a viscosity change of less than 8% over 12 months.

In the above technical solution, the precursors provided by the present invention are soluble polymers. Due to special treatment in its preparation process, the precursor not only has the processability of a polymer so that it can be used for the preparation of ceramic matrix composite materials, coatings, fibers, and the like, but also has good storage performance, exhibiting a relatively small viscosity change during long-term storage at room temperature.

In the above technical solution, the precursors provided by the present invention are prepared by cohydrolysis of transition metal alkoxides and rare earth element-containing compounds. Transition metal elements and rare earth elements in the prepared precursors are homogenously distributed at molecular level, leading to short-range distribution of each element in the pyrolysis process, which is conducive to solid solution reactions of the metal elements and thus the solid solutions can be obtained at a relatively low temperature. The precursors have processability and are suitable for popularization and use.

The present invention further provides a method for preparing the high-entropy carbide ceramic precursors as described above. The preparation method includes the following steps.

(1) Obtaining metal alkoxide complexes: A complexing agent is added dropwise into metal alkoxides $M(OR)_n$, followed by stirring for 0.1-5 hours to obtain the metal alkoxide complexes.

(2) Cohydrolysis: At least four metal alkoxide complexes comprising different metal elements prepared according to step (1) are selected and mixed uniformly, followed by adding dropwise a mixture of water and a monohydric alcohol, refluxing for 1-5 hours, and then atmospheric distillation to obtain a metal alkoxide copolymer.

(3) Preparation of the precursor: The metal alkoxide copolymer prepared in step (2) is mixed uniformly with allyl-functional novolac resin, followed by heating to 50-90° C. and reacting for 0.5-4 hours, and then cooling to obtain the high-entropy carbide ceramic precursor.

According to the above preparation method, in step (1), a molar ratio of each of the metal alkoxides to the complexing agent is 1:(0.15-0.5)n. When M in the metal alkoxides is selected from Ti, Zr, and Hf, n is 4; when M in the metal alkoxides is selected from V, Nb, Ta, and Mo, n is 5; and when M is W, n is 6. The complexing agent is acetylacetone and/or ethyl acetoacetate.

In the above technical solution, the inventors of the present invention found that the reactivity of metal alkoxides and complexing agent is greatly affected by the types of metal elements. If the complexing agents are added at similar proportions, although alkoxide complexes can be formed, the hydrolysis rate of the resulting alkoxide complexes will be affected. The improper amounts of the complexing agents would lead to mismatch of the cohydrolysis rate of the alkoxide complexes, thus lead to non-homogeneous element distribution of metals in high-entropy ceramic precursor. By adopting the molar ratio of metal alkoxide to complexing agent provided in the present application, however, the above problem can be addressed and stable system can be formed in cohydrolysis process.

According to the above preparation method, in step (2), a molar ratio of water to total metal elements is 0.8-1.3:1; a mass ratio of the monohydric alcohol to water is 3-8:1; and the monohydric alcohol is one or more selected from methanol, ethanol, isopropanol, n-propanol, n-butanol, isobutanol, ethylene glycol methyl ether, and ethylene glycol ethyl ether.

In the above technical solution, the quantities of alcohol and water provided by the present invention are obtained based on consideration of the mixture of the metal alkoxide complexes having different reactivity, so that the metal alkoxide complexes tend to have similar reactivity during the cohydrolysis, thereby obtaining a precursor with homogenous distribution of each element at a molecular level.

According to the above preparation method, in step (3), a ratio of the total molar quantity of metal elements in the metal alkoxide copolymer to the mass of the allyl-functional novolac resin is 1 mol:18-20 g.

In the above preparation method, different metals have different molar masses, and it is thus inconvenient to calculate all the metals based on the mass. The present invention herein calculates the metals based on the total molar quantity of the metal elements in the metal alkoxide copolymer. The allyl-functional novolac resin is a kind of heteropolymer, which is unsuitable to be measured by molar quantity. Therefore, the ratio of molar quantity to mass quantity is adopted for expression.

According to the above preparation method, when M in the metal alkoxides is selected from Hf, V, Nb, Ta, Mo, and W, the metal alkoxides in step (1) each are prepared by reacting a metal salt with a monohydric alcohol as follows. The metal salt $MCl_n$ or $M(NO_3)_n$ is dispersed in a solvent, followed by adding monohydric alcohol dropwise at −10-5° C. and then adding triethylamine dropwise to obtain a mixture, which is then refluxed for 1-5 hours and filtered to obtain a metal alkoxide solution. A ratio of the metal salt to the monohydric alcohol to triethylamine is 1:(1-2)n:(1-1.5) n. The solvent is one or more selected from n-hexane, n-heptane, toluene, xylene, ethylene glycol dimethyl ether, ethylene glycol diethyl ether, and tert-butyl methyl ether. The monohydric alcohol is one or more selected from methanol, ethanol, isopropanol, n-propanol, n-butanol, isobutanol, ethylene glycol methyl ether, and ethylene glycol ethyl ether.

According to the above preparation method, in step (1), the complexing agent is added dropwise into the metal alkoxides $M(OR)_n$ at a temperature ranging from room temperature to 80° C., and in step (2), the mixture of water and the monohydric alcohol is added dropwise into the system of the various mixed metal alkoxide complexes at a temperature ranging from room temperature to 90° C.

According to the above preparation method, the preparation method specifically includes the following steps.

(1) Obtaining metal alkoxides: Transition metal alkoxides containing different elements are selected. When M in the metal alkoxides is selected from Hf, V, Nb, Ta, Mo, and W, the metal alkoxides each are prepared as follows. The metal salt $MCl_n$ or $M(NO_3)_n$ is dispersed in a solvent, followed by adding monohydric alcohol dropwise at −10° C. to 5° C. and then adding triethylamine dropwise to obtain a mixture, which is then refluxed for 1-5 hours and filtered to obtain a metal alkoxide solution. A ratio of the metal salt to the monohydric alcohol to triethylamine is 1:(1-2)n:(1-1.5)n. The solvent is one or more selected from n-hexane, n-heptane, toluene, xylene, ethylene glycol dimethyl ether, ethylene glycol diethyl ether, and tert-butyl methyl ether. The monohydric alcohol is one or more selected from methanol, ethanol, isopropanol, n-propanol, n-butanol, isobutanol, ethylene glycol methyl ether, and ethylene glycol ethyl ether.

(2) Preparation of metal alkoxide complexes: A complexing agent is added dropwise into the metal alkoxides M(OR)n selected in step (1) at a temperature ranging from room temperature to 80° C., followed by stirring for 0.1-5 hours to prepare respective metal alkoxide complexes. A molar ratio of each of the metal alkoxides to the complexing agent is 1:(0.15-0.5) n. When M in the metal alkoxides is selected from Ti, Zr, and Hf, n is 4; when M in the metal alkoxides is selected from V, Nb, Ta, and Mo, n is 5; and when M is W, n is 6. The complexing agent is one of acetylacetone and ethyl acetoacetate, or a combination thereof.

(3) Cohydrolysis: At least four metal alkoxide complexes containing different metal elements prepared according to step (2) are selected and mixed uniformly, followed by adding a mixture of water and a monohydric alcohol dropwise at a temperature ranging from room temperature to 90° C. A molar ratio of water to total metal elements is 0.8-1.3:1, and a mass ratio of the monohydric alcohol to water is 3-8:1. After that, the resulted mixture is refluxed for 1-5 hours, and is subjected to atmospheric distillation to obtain a metal alkoxide copolymer. The monohydric alcohol is one or more selected from methanol, ethanol, isopropanol, n-propanol, n-butanol, isobutanol, ethylene glycol methyl ether, and ethylene glycol ethyl ether.

(4) Preparation of the precursor: The metal alkoxide copolymer obtained in step (3) is mixed uniformly with allyl-functional novolac resin, with a total molar quantity of the metal elements to a mass of the allyl-functional novolac resin being 1 mol:18-20 g, followed by heating to 50-90° C. and reacting for 0.5-4 hours, and then cooling to obtain the high-entropy carbide ceramic precursor.

The present invention also provides a method for preparing rare earth-containing high-entropy carbide ceramic precursor. The method includes the following steps.

(1) Preparation of transition metal alkoxide complexes: A complexing agent is added into transition metal alkoxides M(OR)n dropwise at a temperature ranging from room temperature to 80° C., followed by stirring for 0.1-5 hours to obtain respective complexes.

(2) Cohydrolysis: At least four transition metal alkoxide complexes containing different metal elements prepared in step (1) are selected and mixed uniformly with rare earth element-containing compound, followed by adding the mixture of water and a monohydric alcohol into the system dropwise at a temperature ranging from room temperature to 90° C., refluxing for 1-5 hours, and atmospheric distillation to obtain a metal copolymer.

(3) Preparation of the precursor: The metal copolymer obtained in step (2) is mixed uniformly with allyl-functional novolac resin, followed by heating to 50-90° C. for 0.5-4 hours, and then cooling to obtain rare earth-containing high-entropy carbide ceramic polymer precursor.

In the above technical solution, the precursor provided by the present invention is a multi-component system containing a variety of metal elements. The selected transition metal elements are concentrated in groups VB, IVB and VIB, but due to the different reactivity of transition metals, if the complexing agents are added at similar proportions, although alkoxide complexes can be formed, the hydrolysis rate of the resulting alkoxide complexes will be affected. The improper amounts of the complexing agents would lead to mismatch of the cohydrolysis rate of the alkoxide complexes, thus lead to non-homogeneous element distribution of metals in high-entropy ceramic precursor. By adopting the molar ratio of metal alkoxide to complexing agent provided in the present application, however, the competitive reactions between different metal alkoxides can be balanced and stable system can be formed in cohydrolysis process.

According to the above preparation method, the rare earth element-containing compound in step (2) is at least one selected from yttrium acetylacetonate and lanthanum acetylacetonate.

According to the above preparation method, a molar ratio of each of the transition metal alkoxides to the complexing agent in step (1) is 1:(0.15-0.5)n. When M in the transition metal alkoxides is selected from Ti, Zr, and Hf, n is 4; when M in the transition metal alkoxides is selected from V, Nb, Ta, and Mo, n is 5; and when M in the transition metal alkoxides is W, n is 6. The complexing agent is acetylacetone and/or ethyl acetoacetate.

According to the above method, step (2), before mixing the rare earth element-containing compound with the transition metal alkoxide complexes, further includes adding a monohydric alcohol to the rare earth element-containing compound, followed by refluxing for 0.5-5 hours. A molar ratio of the monohydric alcohol to the rare earth element-containing compound is 5-10:1. The monohydric alcohol is one or more selected from methanol, ethanol, isopropanol, n-propanol, n-butanol, isobutanol, ethylene glycol methyl ether, and ethylene glycol ethyl ether.

According to the above preparation method, when M in the metal alkoxides is selected from Hf, V, Nb, Ta, Mo, and W, the metal alkoxides in step (1) are prepared by reacting corresponding metal salt with a monohydric alcohol as follows: dispersing the metal salt $MCl_n$ or $M(NO_3)_n$ in a solvent, followed by adding monohydric alcohol dropwise at −10 to 5° C. and then adding triethylamine dropwise to obtain a mixture, which is then refluxed for 1-5 hours and filtered to obtain a metal alkoxide solution. A ratio of the metal salt to the monohydric alcohol to triethylamine is 1:(1-2)n:(1-1.5)n. The solvent is one or more selected from n-hexane, n-heptane, toluene, xylene, ethylene glycol dimethyl ether, ethylene glycol diethyl ether, and tert-butyl methyl ether. The monohydric alcohol is one or more selected from methanol, ethanol, isopropanol, n-propanol, n-butanol, isobutanol, ethylene glycol methyl ether, and ethylene glycol ethyl ether.

According to the above preparation method, in step (2), a molar ratio of water to total metal elements is 0.8-1.3:1, and a mass ratio of the monohydric alcohol to water is 3-8:1. The monohydric alcohol is one or more selected from methanol, ethanol, isopropanol, n-propanol, n-butanol, isobutanol, ethylene glycol methyl ether, and ethylene glycol ethyl ether.

In the above technical solution, the quantities of alcohol and water provided by the present invention are obtained based on a consideration of the mixture of metal alkoxide complexes having different reactivity, so that the metal alkoxide complexes tend to have similar reactivity during the cohydrolysis, thereby obtaining a precursor with homogenous distribution of each element at a molecular level.

According to the above preparation method, in step (3), a ratio of a total molar quantity of the metal elements in the metal alkoxide copolymer to a mass of the allyl-functional novolac resin is 1 mol:13-15 g.

In the above preparation method, different metals have different molar masses, and it is thus inconvenient to calculate all the metals based on the mass. The present invention herein calculates the metals based on the total molar quantity of the metal elements in the metal alkoxide copolymer. The allyl-functional novolac resin is a heteropolymer and it is not suitable to measure it by molar quantity. Therefore, the ratio of molar quantity to mass quantity is adopted for expression.

According to the above preparation method, the preparation method specifically includes the following steps.

(1) Obtaining metal alkoxides: Transition metal alkoxides containing different elements are selected. When M in the metal alkoxides is selected from Hf, V, Nb, Ta, Mo, and W, the metal alkoxides each are prepared as follows. Metal salt $MCl_n$ or $M(NO_3)_n$ is dispersed in solvent, followed by adding monohydric alcohol dropwise at −10-5° C., and then adding triethylamine dropwise. The resulted mixture is refluxed for 1-5 hours, and then filtered to obtain metal alkoxide solution. A ratio of the metal salt to the monohydric alcohol to triethylamine is 1:(1-2)n:(1-1.5)n. When M in the metal salt is selected from Ti, Zr and Hf, n is 4; when M in the metal salt is selected from V, Nb, Ta, and Mo, n is 5; and when M in the metal salt is W, n is 6. The solvent is one or more selected from n-hexane, n-heptane, toluene, xylene, ethylene glycol dimethyl ether, ethylene glycol diethyl ether, and tert-butyl methyl ether. The monohydric alcohol is one or more selected from methanol, ethanol, isopropanol, n-propanol, n-butanol, isobutanol, ethylene glycol methyl ether, and ethylene glycol ethyl ether.

(2) Preparation of metal alkoxide complexes: A complexing agent is added dropwise into the metal alkoxides M(OR)n selected in step (1) at a temperature ranging from room temperature to 80° C., followed by stirring for 0.1-5 hours to obtain respective metal alkoxide complexes. A molar ratio of each of the metal alkoxides to the complexing agent is 1:(0.15-0.5)n. When M in the metal alkoxides is selected from Ti, Zr, and Hf, n is 4; When M in the metal alkoxides is selected from V, Nb, Ta, and Mo, n is 5; and when M in the metal alkoxides is W, n is 6. The complexing agent is acetylacetone and/or ethyl acetoacetate.

(3) Cohydrolysis: At least four transition metal alkoxide complexes containing different metal elements prepared according to step (2) are selected and mixed uniformly with rare earth element-containing compound, followed by adding mixture of water and a monohydric alcohol into the system dropwise at a temperature ranging from room temperature to 90° C., with a molar ratio of water to total metal elements being 0.8-1.3:1, and a mass ratio of the monohydric alcohol to water being 3-8:1. After that, resulted mixture is refluxed for 1-5 hours, and subjected to atmospheric distillation to obtain a metal copolymer.

(4) Preparation of the precursor: The metal copolymer prepared in step (3) is mixed uniformly with allyl-functional novolac resin, with a ratio of a molar quantity of metal elements in the copolymer to a mass of the allyl-functional novolac resin being 1 mol:13-15 g, followed by heating to 50-90° C. and reacting for 0.5-4 hours, and then cooling to obtain a rare earth-containing high-entropy carbide ceramic precursor.

Preferably, step (2), before mixing the rare earth element-containing compound with the transition metal alkoxide complexes, further includes adding a monohydric alcohol to the rare earth element-containing compound, followed by refluxing for 0.5-5 hours. A molar ratio of the monohydric alcohol to the rare earth element-containing compound is 5-10:1. The monohydric alcohol is one or more selected from methanol, ethanol, isopropanol, n-propanol, n-butanol, isobutanol, ethylene glycol methyl ether, and ethylene glycol ethyl ether.

The present invention provides a high-entropy carbide ceramic. The high-entropy carbide ceramic is prepared from the high-entropy carbide ceramic precursor provided by the present invention. The high-entropy carbide ceramic has a single-phase structure, with all elements distributed homogenously at molecular level. The high-entropy carbide ceramic includes at least four or at least six to eight elements selected from Ti, Zr, Hf, V, Nb, Ta, Mo, and W, and each with a molar percentage 5-35% of the total molar quantity of metal elements in the precursor. Preferably, the high-entropy carbide ceramic includes no less than five of the metal elements, and the molar quantity of each metal element in the ceramic are equal.

In the above technical solution, the precursor provided by the present invention is prepared by cohydrolysis of metal alkoxides. Each element in the prepared precursor is uniformly distributed at a molecular level, leading to short-range distribution of each element in the pyrolysis process, which is conducive to solid solution reactions of the metal elements and thus the solid solutions can be obtained at a relatively low temperature.

The present invention also provides a rare earth-containing high-entropy carbide ceramic. The rare earth-containing high-entropy carbide ceramic has a single-phase structure, and includes at least four transition metal elements and at least one rare-earth metal element, and all elements distributed homogenously at molecular level. The transition metal elements are selected from Ti, Zr, Hf, V, Nb, Ta, Mo, and W, and the rare earth element is selected from Y and La. Preferably, the molar quantity of each transition metal element and the rare earth element in the ceramic are equal.

The present invention provides a high-entropy carbide ceramic fiber. The high-entropy ceramic fiber includes at least four elements selected from Ti, Zr, Hf, V, Nb, Ta, Mo, and W, and the high-entropy carbide ceramic fiber has a single-phase structure, with all elements distributed homogenously at molecular level.

In a further technical solution of the present invention, the metal elements in the high-entropy ceramic fiber each has a molar percentage 5-35% of the total molar quantity of metal elements in the fiber. Preferably, the molar quantity of each transition metal element in the fiber are equal.

The present invention also provides a high-entropy carbide ceramic product, which is the high-entropy carbide ceramic or the rare earth-containing high-entropy carbide ceramic or the high-entropy carbide ceramic fiber.

The present invention also provides a method for preparing the above high-entropy carbide ceramic. The high-entropy carbide ceramic is prepared by curing and pyrolysis the high-entropy carbide ceramic precursor provided by the present invention. The pyrolysis is carried out at a temperature of not lower than 1400° C., preferably at a temperature of 1700-2000° C., for 0.5-5 hours, under protection of a vacuum environment or an inert atmosphere. The inert atmosphere is selected from argon, helium, or a mixture thereof.

The present invention also provides a method for preparing the above rare earth-containing high-entropy carbide ceramic. The rare earth-containing high-entropy carbide ceramic is prepared by curing and pyrolysis the rare earth-containing high-entropy carbide ceramic precursor provided by the present invention. The pyrolysis is carried out at a temperature of not lower than 1600° C., preferably at a temperature of 1700-2000° C., for 0.5-5 hours, under protection of a vacuum environment or an inert atmosphere. The inert atmosphere is selected from argon, helium, or a mixture thereof.

In the existing technologies, high-entropy carbide ceramics are mostly prepared by metal carbide powder reaction sintering method, which need harsh preparation conditions, such as high temperatures and high pressures, and thus has high requirements for equipment. Moreover, solid solutions obtained by this method usually have relatively low purity (presence of oxide impurity peaks in XRD graph) and exhibit inhomogeneous distribution of elements. Besides, this method cannot be used to prepare carbide solid solutions with low entropy forming ability, such as $HfNbTaTiWC_5$, $HfTaTiWZrC_5$, $HfMoTaWZrC_5$, etc. Due to the difficulty in atomic diffusion, the traditional powder reaction sintering method cannot prepare solid solution with metal elements that have a large difference in atomic size. Therefore, research on high-entropy carbide ceramics in the existing technologies is only limited to some elements of groups IVB, VB, and VIB, and there has not been any report on rare-earth metal-containing high-entropy carbide ceramics.

The present invention also provides a method for preparing high-entropy carbide ceramic fiber. The method prepares green fiber by blowing spinning, electrospinning, or centrifugal spinning, and high-entropy carbide ceramic fiber is obtained by subjecting the green fiber to pyrolyzation and high-temperature solid solution. The preparation method overcomes the limitation that traditional methods can only prepare high-entropy ceramics in forms of powder, block, and coating, and expands the existing forms of high-entropy ceramics to fibers.

The preparation method includes uniformly mixing high-entropy carbide ceramic precursor containing target metal elements with spinning aid and solvent to prepare a spinnable precursor solution, followed by spinning, pyrolyzation, and high-temperature solid solution, to prepare the high-entropy carbide ceramic fiber.

In the above technical solution, the present invention adopts a reasonable combination of raw materials. The prepared spinnable precursor solution has characteristics of adjustable rheological properties, good spinning performance, long storage period, etc., and can be stored with seal at room temperature over 3 weeks with a viscosity change of less than 5%. This reduces restrictions on subsequent processes (spinning, pyrolyzation, high-temperature solid solution, etc.).

In the above preparation method for preparing the high-entropy carbide ceramic fiber, in the spinnable precursor solution, a mass ratio of the high-entropy carbide ceramic precursor to the spinning aid to the solvent is 1:0.1-1:5-20, preferably 1:0.2-0.5:5-10.

In the above technical solution, the preparation or mixing of the spinnable precursor solution may be achieved by other technical means, including but not limited to stirring, ultrasonic method, etc.

According to the above preparation method, the spinning aid is one or more selected from polymethyl methacrylate, polyvinyl acetate, polyvinyl butyral, and polyvinylpyrrolidone.

In the above technical solution, the spinning aid helps to improve the rheological properties of the solution, such as viscosity, dispersion homogeneity, and stability. A conventional spinning aid in the art may be used, and the spinning aid is preferably one selected from polymethyl methacrylate, polyvinyl acetate, polyvinyl butyral, and polyvinylpyrrolidone, or a mixture of some of the foregoing, such as a mixture of polymethyl methacrylate and polyvinyl acetate at any ratio, or a mixture of polyvinyl acetate and polyvinyl butyral at any ratio, or a mixture of polyvinyl butyral and polyvinylpyrrolidone at any ratio.

According to the above preparation method, the solvent is one or more selected from ethanol, acetone, n-propanol, ethylene glycol methyl ether, and N,N-dimethylformamide.

In the above technical solution, the solvent used is arbitrary and is beneficial to the dissolving and dispersing of the raw materials. The solvent is preferably one or more selected from ethanol, acetone, n-propanol, ethylene glycol methyl ether, tert-butyl methyl ether, and N,N-dimethylformamide.

According to the above preparation method, the pyrolyzation includes heating to 500-600° C. at a heating rate of 0.5-5° C./min under an inert atmosphere and keeping at the temperature for 2-4 hours.

In the above technical solution, the inert atmosphere used during the pyrolyzation is one or more selected from nitrogen, argon, and helium.

According to the above preparation method, the high-temperature solid solution includes solutionizing at a temperature of not lower than 1400° C. under vacuum or under an inert atmosphere. Preferably, the solutionizing is carried out at a temperature of 1400-1800° C., for 0.5-5 hours.

In the above technical solution, the inert atmosphere used in the high-temperature solid solution is one or more selected from argon and helium.

According to the above preparation method, the spinning is one selected from blowing spinning, electrospinning, and centrifugal spinning.

In the above technical solution, the spinning is preferably blowing spinning. Conditions of the blowing spinning are: a spinning pressure of 0.02-0.2 MPa, a feeding speed of 10-60 mL/h, and a collecting distance of 10-50 cm. The feeding speed is preferably is 30-60 mL/h. A gas source for the blowing spinning is one or more selected from compressed air, compressed nitrogen, and compressed argon.

In the above technical solution, the spinning is preferably electrospinning. Conditions of the electrospinning are: a spinning voltage of 5-15 kV, a feeding speed of 10-60 mL/h, and a collecting distance of 10-50 cm. The feeding speed is preferably 30-60 mL/h.

In the above technical solution, the spinning is preferably centrifugal spinning. Conditions of the centrifugal spinning are: a rotation speed of 200-5000 r/min, and a collecting distance of 20-100 cm.

DETAILED DESCRIPTION OF THE EMBODIMENTS

The present invention will be further described below in conjunction with particular embodiments. The present invention, however, is not limited to the following embodiments. Unless otherwise specified, methods used are all conventional ones, and raw materials used can all be obtained from open commercial channels.

Example 1

In this example, a precursor and a high-entropy ceramic are prepared using the following methods.

(1) Obtaining metal alkoxides: Metal alkoxides $Zr(OPr)_4$, $Hf(OPr)_4$, $Ta(OPr)_5$, $Mo(OCH_2CH_2OCH_2CH_3)_5$, and $W(OCH_2CH_2OCH_3)_6$ were selected. Among them, $Hf(OPr)_4$, $Ta(OPr)_5$, $Mo(OCH_2CH_2OCH_2CH_3)_5$, and $W(OCH_2CH_2OCH_3)_6$ were prepared as follows. Metal salts $HfCl_4$, $TaCl_5$, $MoCl_5$, and $WCl_6$ were separately dispersed in n-heptane to obtain respective mixtures, into which monohydric alcohols n-propanol, n-propanol, ethylene glycol ethyl ether, and ethylene glycol methyl ether were respectively added at −10° C., followed by adding triethylamine dropwise. After that, each mixtures were refluxed for 1 hour and then filtered to obtain respective metal alkoxide solutions. Ratios of the metal salts to the respective monohydric alcohols to triethylamine were 1:4:4, 1:5:6, 1:6:5, and 1:8:7, respectively.

(2) Preparing metal alkoxide complexes: Acetylacetone was added dropwise into each of the metal alkoxides $Zr(OPr)_4$, $Hf(OPr)_4$, $Ta(OPr)_5$, $Mo(OCH_2CH_2OCH_2CH_3)_5$, and $W(OCH_2CH_2OCH_3)_6$ at 40° C., followed by stirring for 0.1 hour. Molar ratios of the metal alkoxides $Zr(OPr)_4$, $Hf(OPr)_4$, $Ta(OPr)_5$, $Mo(OCH_2CH_2OCH_2CH_3)_5$, and $W(OCH_2CH_2OCH_3)_6$ to acetylacetone were 1:0.8, 1:1, 1:1, 1:1.2, and 1:1.5, respectively.

(3) Cohydrolysis: The metal alkoxide complexes obtained in step (2) were uniformly mixed in an equal metal molar ratio. A mixture of water and n-propanol was added dropwise into the resulted system at room temperature. A molar ratio of water to total metal elements was 1:1, and a mass ratio of n-propanol to water was 4:1. Then, refluxing was performed for 5 hours, followed by atmospheric distillation to obtain a metal alkoxide copolymer.

(4) Preparation of a precursor: The metal alkoxide copolymer obtained in step (3) was uniformly mixed with allyl-functional novolac resin. A ratio of a total molar quantity of metal elements in the alkoxide copolymer to a mass of the allyl-functional novolac resin was 1 mol:18 g. The resultant mixture was heated to 80° C. and reacted for 1 hour, and then cooled to obtain a high-entropy carbide ceramic precursor.

Figure 1:
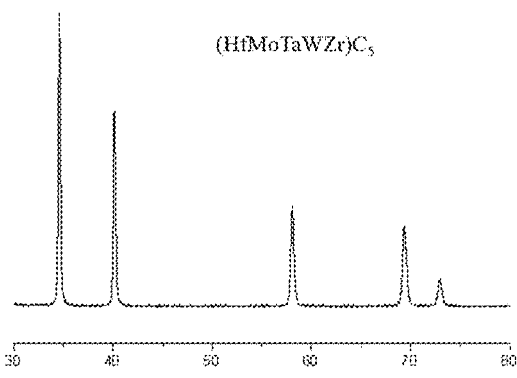
FIG. 1 is an XRD pattern of a ceramic obtained in Example 1.
Figure 2:
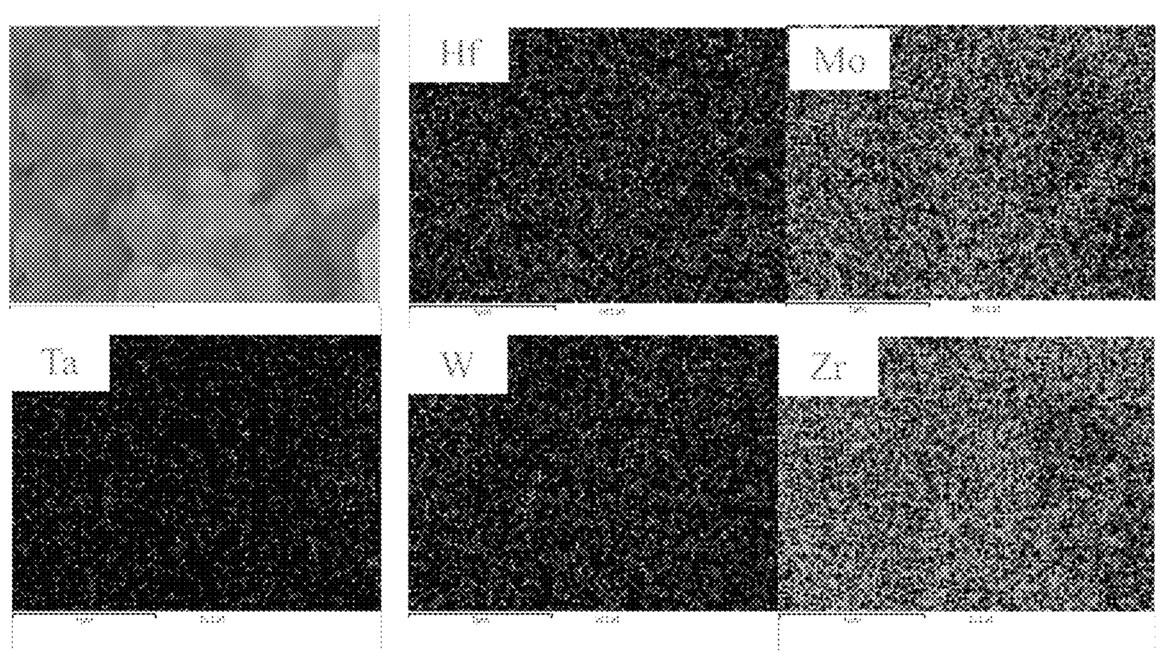
FIG. 2 is a SEM-EDX image of the ceramic obtained in Example 1.

The obtained precursor was heated and cured in an oven, then pyrolyzed at 1700° C. for 2 hours in a high-temperature furnace under vacuum, and cooled to obtain (HfMoTaWZr)$C_5$ high-entropy ceramic. The XRD pattern of the ceramic is shown in FIG. 1. The XRD pattern presents only one set of diffraction peaks, indicating occurrence of solutionizing which enables metal atoms to be completely solutionized into one crystal lattice, and the system does not contain oxide impurities. FIG. 2 is a scanning electron microscopy with energy dispersive X-ray spectroscopy (SEM-EDX) image of the obtained high-entropy carbide ceramic. It can be seen from the image that the elements are distributed uniformly.

Example 2

In this example, a precursor and a high-entropy ceramic are prepared using the following methods.

(1) Obtaining metal alkoxides: Metal alkoxides $Zr(OPr)_4$, $Hf(OPr)_4$, $Ti(Oi\text{-}Pr)_4$, $Mo(OCH_2CH_2OCH_2CH_3)_5$, and $W(OCH_2CH_2OCH_3)_6$ were selected. Among them, $Hf(OPr)_4$, $Mo(OCH_2CH_2OCH_2CH_3)_5$, and $W(OCH_2CH_2OCH_3)_6$ were prepared by the method as used in Example 1.

(2) Preparing metal alkoxide complexes: Acetylacetone was added dropwise into each of the metal alkoxides $Zr(OPr)_4$, $Hf(OPr)_4$, $Ti(Oi\text{-}Pr)_4$, $Mo(OCH_2CH_2OCH_2CH_3)_5$, and $W(OCH_2CH_2OCH_3)_6$ at 80° C., followed by stirring for 0.1 hour. Molar ratios of the metal alkoxides $Zr(OPr)_4$, $Hf(OPr)_4$, $Ti(Oi\text{-}Pr)_4$, $Mo(OCH_2CH_2OCH_2CH_3)_5$, and $W(OCH_2CH_2OCH_3)_6$ to acetylacetone were 1:1, 1:1, 1:2, 1:1, and 1:2, respectively.

(3) Cohydrolysis: The metal alkoxide complexes obtained in step (2) were uniformly mixed in an equal metal molar ratio. A mixture of water and n-propanol was added dropwise into the resulted system at room temperature. A molar ratio of water to total metal elements was 1.3:1, and a mass ratio of n-propanol to water was 6:1. Then, refluxing was performed for 5 hours, followed by atmospheric distillation to obtain a metal alkoxide copolymer.

(4) Preparation of a precursor: The metal alkoxide copolymer obtained in step (3) was uniformly mixed with allyl-functional novolac resin. A ratio of a total molar quantity of metal elements in the alkoxide copolymer to a mass of the allyl-functional novolac resin was 1 mol:18.5 g. The resultant mixture was heated to 50° C. and reacted for 4 hours, and then cooled to obtain a high-entropy carbide ceramic precursor.

Figure 3:
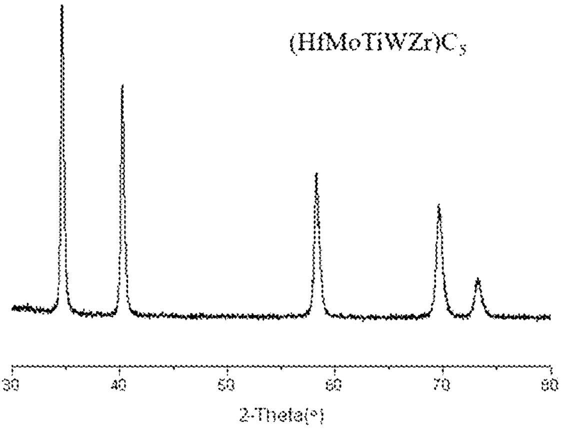
FIG. 3 is an XRD pattern of a ceramic obtained in Example 2.

The obtained precursor was heated and cured in an oven, then pyrolyzed at 1700° C. for 2 hours in a high-temperature furnace under vacuum, and cooled to obtain (HfMoTiWZr)$C_5$ high-entropy ceramic. The XRD pattern of the ceramic is shown in FIG. 3. The XRD pattern presents only one set of diffraction peaks, indicating occurrence of solutionizing which enables metal atoms to be completely solutionized into one crystal lattice, and the system does not contain oxide impurities.

Example 3

In this example, a precursor and a high-entropy ceramic are prepared using the following methods.

(1) Obtaining metal alkoxides: Metal alkoxides $Zr(Oi\text{-}Pr)_4$, $Hf(Oi\text{-}Pr)_4$, $Ti(OPr)_4$, and $Ta(OCH_2CH_2OCH_3)_5$ were selected. Among them, $Hf(Oi\text{-}Pr)_4$ and $Ta(OCH_2CH_2OCH_3)_5$ were prepared as follows. Metal salts $HfCl_4$ and $TaCl_5$ were dispersed in xylene and tert-butyl methyl ether respectively to obtain respective mixtures, into which monohydric alcohols isopropanol and ethylene glycol methyl ether were respectively added at 0° C., followed by adding triethylamine dropwise. After that, each mixtures were refluxed for 2 hours and then filtered to obtain respective metal alkoxide solutions. Ratios of the metal salts to the respective monohydric alcohols to triethylamine were 1:4:4 and 1:10:6, respectively.

(2) Preparing metal alkoxide complexes: Ethyl acetoacetate was added dropwise into each of the metal alkoxides $Zr(OPr)_4$, $Hf(Oi\text{-}Pr)_4$, $Ti(OPr)_4$, and $Ta(OCH_2CH_2OCH_3)_5$ at room temperature, followed by stirring for 0.5 hour. Molar ratios of the metal alkoxides $Zr(OPr)_4$, $Hf(Oi\text{-}Pr)_4$, $Ti(OPr)_4$, and $Ta(OCH_2CH_2OCH_3)_5$ to ethyl acetoacetate were 1:2, 1:0.6, 1:1 and 1:2.5, respectively.

(3) Cohydrolysis: The metal alkoxide complexes obtained in step (2) were uniformly mixed in an equal metal molar ratio. A mixture of water and ethylene glycol ethyl ether was added dropwise into the resulted system at room temperature. A molar ratio of water to total metal elements was 0.8:1, and a mass ratio of propanol to water was 5:1. Then, refluxing was performed for 5 hours, followed by atmospheric distillation to obtain a metal alkoxide copolymer.

(4) Preparation of a precursor: The metal alkoxide copolymer obtained in step (3) was uniformly mixed with allyl-functional novolac resin. A ratio of a total molar quantity of metal elements in the alkoxide copolymer to a mass of the allyl-functional novolac resin was 1 mol:20 g. The resultant mixture was heated to 80° C. and reacted for 1 hour, and then cooled to obtain a high-entropy carbide ceramic precursor.

Figure 4:
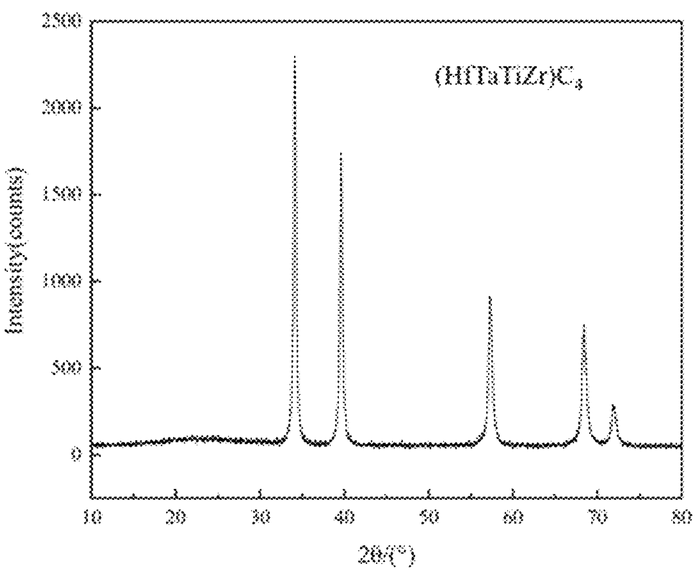
FIG. 4 is an XRD pattern of a ceramic obtained in Example 3.
Figure 5:
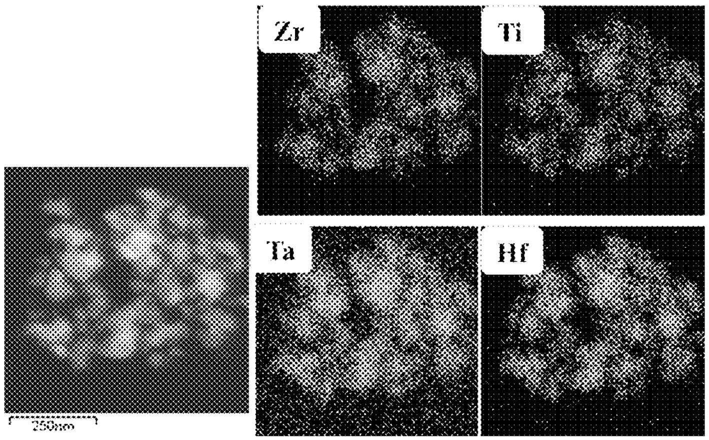
FIG. 5 is a TEM-EDS image of the ceramic obtained in Example 3.

The obtained precursor was heated and cured in an oven, then pyrolyzed at 1800° C. for 1 hour in a high-temperature furnace under argon, and cooled to obtain (ZrHfTaTi)$C_4$ high-entropy ceramic. The XRD pattern of the ceramic is shown in FIG. 4. The XRD pattern presents only one set of diffraction peaks, indicating occurrence of solutionizing which enables metal atoms to be completely solutionized into one crystal lattice, and the system does not contain oxide impurities. FIG. 5 is a scanning electron microscopy with energy dispersive X-ray spectroscopy (SEM-EDX) image of the ceramic. It can be seen from the image that the elements in the system are distributed very uniformly.

Example 4

In this example, a precursor and a high-entropy ceramic are prepared using the following methods.

(1) Obtaining metal alkoxides: Metal alkoxides $Zr(Oi\text{-}Pr)_4$, $Hf(OPr)_4$, $Ti(OPr)_4$, $Ta(OCH_2CH_2OCH_3)_5$, $Mo(OPr)_5$, and $W(Oi\text{-}Pr)_6$ were selected. Among them, $Mo(OPr)_5$ and $W(Oi\text{-}Pr)_6$ were prepared as follows. Metal salts $MoCl_5$ and $WCl_6$ were dispersed in n-hexane and petroleum ether respectively to obtain respective mixtures, into which monohydric alcohols n-propanol and isopropanol were respectively added at 0° C., followed by adding triethylamine dropwise. After that, each mixtures were refluxed for 2 hours and then filtered to obtain respective metal alkoxide solutions. Ratios of the metal salts to the respective monohydric alcohols to triethylamine were 1:6:6 and 1:8:7, respectively.

(2) Preparing metal alkoxide complexes: Acetylacetone was added dropwise into each of the metal alkoxides Zr(Oi-Pr)$_4$, Hf(OPr)$_4$, Ti(OPr)$_4$, Ta(OCH$_2$CH$_2$OCH$_3$)$_5$, Mo(OPr)$_5$, and W(Oi-Pr)$_6$ at room temperature, followed by stirring for 1 hour. Molar ratios of the metal alkoxides Zr(Oi-Pr)$_4$, Hf(OPr)$_4$, Ti(OPr)$_4$, Ta(OCH$_2$CH$_2$OCH$_3$)$_5$, Mo(OPr)$_5$, and W(Oi-Pr)$_6$ to acetylacetone were 1:2, 1:0.6, 1:1, 1:1.5, 1:2.5, and 1:0.9, respectively.

(3) Cohydrolysis: The metal alkoxide complexes obtained in step (2) were uniformly mixed in an equal metal molar ratio. A mixture of water and n-propanol was added dropwise into the resulted system at 80° C. A molar ratio of water to total metal elements was 1.2:1, and a mass ratio of n-propanol to water was 3:1. Then, refluxing was performed for 3 hours, followed by atmospheric distillation to obtain a metal alkoxide copolymer.

(4) Preparation of a precursor: The metal alkoxide copolymer obtained in step (3) was uniformly mixed with allyl-functional novolac resin. A ratio of a total molar quantity of metal elements in the alkoxide copolymer to a mass of the allyl-functional novolac resin was 1 mol:19 g. The resultant mixture was heated to 80° C. and reacted for 1 hour, and then cooled to obtain a high-entropy carbide ceramic precursor.

Figure 6:
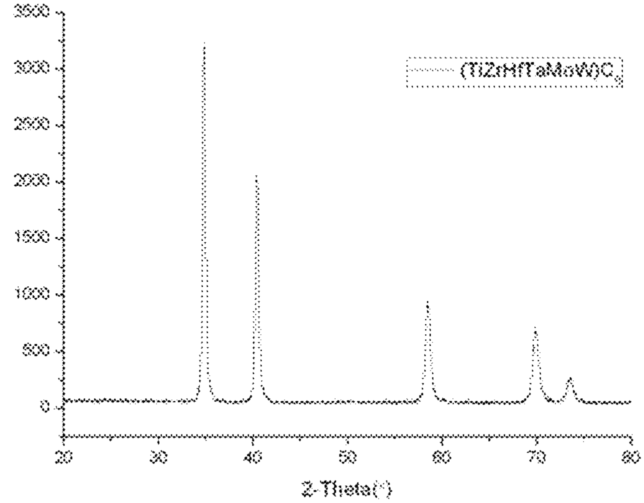
FIG. 6 is an XRD pattern of a ceramic obtained in Example 4.

The obtained precursor was heated and cured in an oven, then pyrolyzed at 1700° C. for 5 hours in a high-temperature furnace under vacuum, and cooled to obtain (TiZrHfTaMoW)C$_6$ high-entropy ceramic. The XRD pattern of the ceramic is shown in FIG. 6. The XRD pattern presents only one set of diffraction peaks, indicating occurrence of solutionizing which enables metal atoms to be completely solutionized into one crystal lattice, and the system does not contain oxide impurities.

Example 5

In this example, a precursor and a high-entropy ceramic are prepared using the following methods.

(1) Obtaining metal alkoxides: Metal alkoxides Zr(Oi-Pr)$_4$, Hf(Oi-Pr)$_4$, Ti(OPr)$_4$, Ta(OCH$_2$CH$_2$OCH$_3$)$_5$, Nb(OPr)$_5$, and W(OCH$_2$CH$_2$OCH$_3$)$_6$ were selected. Among them, Hf(OPr)$_4$ and Ta(OCH$_2$CH$_2$OCH$_3$)$_5$ were prepared by the method as used in Example 3, and W(OCH$_2$CH$_2$OCH$_3$)$_6$ was prepared by the method as used in Example 1. Nb(OPr)$_5$ was prepared as follows. A metal salt NbCl$_5$ was dispersed in n-hexane to obtain a mixture, into which a monohydric alcohol n-propanol was added at 5° C., followed by adding triethylamine dropwise. After that, the mixture was refluxed under heating for 2 hours and then filtered to obtain a metal alkoxide solution. A ratio of the metal salt to the monohydric alcohol to triethylamine was 1:6:6.

(2) Preparing metal alkoxide complexes: Acetylacetone was added dropwise into each of the metal alkoxides Zr(Oi-Pr)$_4$, Hf(Oi-Pr)$_4$, Ti(OPr)$_4$, Ta(OCH$_2$CH$_2$OCH$_3$)$_5$, Nb(OPr)$_5$, and W(OCH$_2$CH$_2$OCH$_3$)$_6$ at room temperature, followed by stirring for 1 hour. Molar ratios of the metal alkoxides Zr(Oi-Pr)$_4$, Hf(Oi-Pr)$_4$, Ti(OPr)$_4$, Ta(OCH$_2$CH$_2$OCH$_3$)$_5$, Nb(OPr)$_5$, and W(OCH$_2$CH$_2$OCH$_3$)$_6$ to acetylacetone were 1:2, 1:0.6, 1:1, 1:1.5, 1:2.5, and 1:0.9, respectively.

(3) Cohydrolysis: The metal alkoxide complexes obtained in step (2) were uniformly mixed in an equal metal molar ratio. A mixture of water and n-propanol was added dropwise into the resulted system at 70° C. A molar ratio of water to total metal elements was 1.3:1, and a mass ratio of n-propanol to water was 8:1. Then, refluxing was performed for 1 hour, followed by atmospheric distillation to obtain a metal alkoxide copolymer.

(4) Preparation of a precursor: The metal alkoxide copolymer obtained in step (3) was uniformly mixed with allyl-functional novolac resin. A ratio of a total molar quantity of metal elements in the alkoxide copolymer to a mass of the allyl-functional novolac resin was 1 mol:20 g. The resultant mixture was heated to 80° C. and reacted for 1 hour, and then cooled to obtain a high-entropy carbide ceramic precursor.

Figure 7:
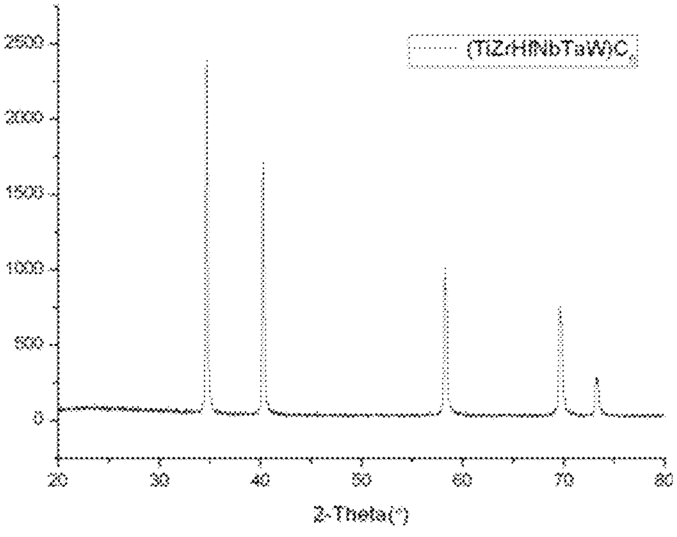
FIG. 7 is an XRD pattern of a ceramic obtained in Example 5.

The obtained precursor was heated and cured in an oven, then pyrolyzed at 2000° C. for 0.5 hour in a high-temperature furnace under helium, and cooled to obtain (TiZrHfNbTaW)C$_6$ high-entropy ceramic. The XRD pattern of the ceramic is shown in FIG. 7. The XRD pattern presents only one set of diffraction peaks, indicating occurrence of solutionizing which enables metal atoms to be completely solutionized into one crystal lattice, and the system does not contain oxide impurities.

Example 6

In this example, a precursor and a high-entropy ceramic are prepared using the following methods.

(1) Obtaining metal alkoxides: Metal alkoxides Ti(O—Pr)$_4$, Zr(Oi-Pr)$_4$, Hf(Oi-Pr)$_4$, Ta(OCH$_2$CH$_2$OCH$_3$)$_5$, Mo(OCH$_2$CH$_2$OCH$_2$CH$_3$)$_5$, Nb(CH$_2$CH$_2$OCH$_3$)$_5$, W(OCH$_2$CH$_2$OCH$_3$)$_6$ were obtained. Among them, Hf(Oi-Pr)$_4$ and Ta(OCH$_2$CH$_2$OCH$_3$)$_5$ were prepared by the method as used in Example 3, and Mo(OCH$_2$CH$_2$OCH$_2$CH$_3$)$_5$ and W(OCH$_2$CH$_2$OCH$_3$)$_6$ were prepared by the method as used in Example 1. Nb(CH$_2$CH$_2$OCH$_3$)$_5$ was prepared as follows. A metal salt NbCl$_5$ was dispersed in n-heptane to obtain a mixture, into which a monohydric alcohol ethylene glycol methyl ether was added at 0° C., followed by adding triethylamine dropwise. After that, the mixture was refluxed under heating for 2 hours and then filtered to obtain a metal alkoxide solution. A ratio of the metal salt to the monohydric alcohol to triethylamine was 1:5:5.

(2) Preparing metal alkoxide complexes: Acetylacetone was added dropwise into each of the metal alkoxides Ti(O—Pr)$_4$, Zr(Oi-Pr)$_4$, Hf(Oi-Pr)$_4$, Ta(OCH$_2$CH$_2$OCH$_3$)$_5$, Mo(OCH$_2$CH$_2$OCH$_2$CH$_3$)$_5$, Nb(CH$_2$CH$_2$OCH$_3$)$_5$, W(OCH$_2$CH$_2$OCH$_3$)$_6$ at 80° C., followed by stirring for 1 hour. Molar ratios of the metal alkoxides Zr(Oi-Pr)$_4$, Hf(Oi-Pr)$_4$, Ti(O—Pr)$_4$, Ta(OCH$_2$CH$_2$OCH$_3$)$_5$, Mo(OCH$_2$CH$_2$OCH$_2$CH$_3$)$_5$, Nb(CH$_2$CH$_2$OCH$_3$)$_5$, and W(OCH$_2$CH$_2$OCH$_3$)$_6$ to acetylacetone were 1:2, 1:0.6, 1:1, 1:1.5, 1:2, 1:1, and 1:1.5, respectively.

(3) Cohydrolysis: The metal alkoxide complexes obtained in step (2) were uniformly mixed in an equal metal molar ratio. A mixture of water and n-propanol was added dropwise into the resulted system at 80° C. A molar ratio of water to total metal elements was 1.1:1, and a mass ratio of n-propanol to water was 8:1. Then, refluxing was performed for 2 hours, followed by atmospheric distillation to obtain a metal alkoxide copolymer.

(4) Preparation of a precursor: The metal alkoxide copolymer obtained in step (3) was uniformly mixed with allyl-functional novolac resin. A ratio of a total molar quantity of metal elements in the alkoxide copolymer to a mass of the allyl-functional novolac resin was 1 mol:20 g. The resultant mixture was heated to 80° C. and reacted for 1 hour, and then cooled to obtain a high-entropy carbide ceramic precursor.

Figure 8:
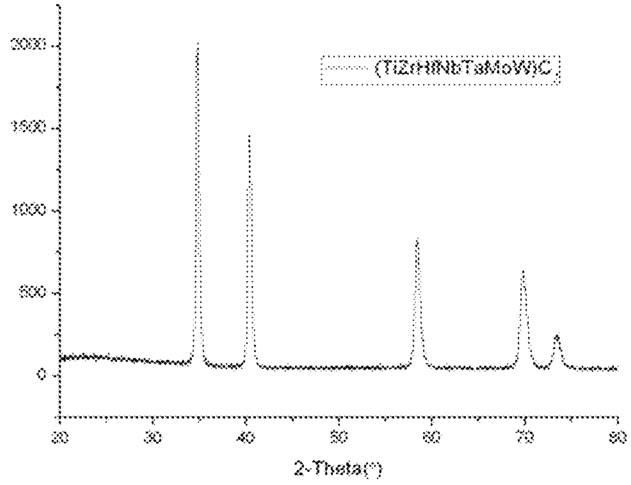
FIG. 8 is an XRD pattern of a ceramic obtained in Example 6.

The obtained precursor was heated and cured in an oven, then pyrolyzed at 1800° C. for 1 hour in a high-temperature furnace under helium, and cooled to obtain (TiZrHfNbTa- MoW)$C_7$ high-entropy ceramic. The XRD pattern of the ceramic is shown in FIG. 8. The XRD pattern presents only one set of diffraction peaks, indicating occurrence of solutionizing which enables metal atoms to be completely solutionized into one crystal lattice, and the system does not contain oxide impurities.

Example 7

In this example, a precursor and a high-entropy ceramic are prepared using the following methods.

(1) Obtaining metal alkoxides: Metal alkoxides Zr(Oi-Pr)$_4$, Hf(Oi-Pr)$_4$, Ti(OPr)$_4$, Ta($OCH_2CH_2OCH_3$)$_5$, and Nb(OPr)$_5$ were obtained. Among them, Hf(Oi-Pr)$_4$ and Ta($OCH_2CH_2OCH_3$)$_5$ were prepared by the method as used in Example 3, and Nb(OPr)$_5$ was prepared by the method as used in Example 5.

(2) Preparing metal alkoxide complexes: Acetylacetone was added dropwise into each of the metal alkoxides Zr(Oi-Pr)$_4$, Hf(Oi-Pr)$_4$, Ti(OPr)$_4$, Ta($OCH_2CH_2OCH_3$)$_5$, and Nb(OPr)$_5$ at 50° C., followed by stirring for 1 hour. Molar ratios of the metal alkoxides Zr(Oi-Pr)$_4$, Hf(Oi-Pr)$_4$, Ti(OPr)$_4$, Ta($OCH_2CH_2OCH_3$)$_5$, and Nb(OPr)$_5$ to acetylacetone were 1:1.2, 1:0.6, 1:1, 1:2, and 1:1.5, respectively.

(3) Cohydrolysis: The metal alkoxide complexes obtained in step (2) were uniformly mixed in an equal metal molar ratio. A mixture of water and n-propanol was added dropwise into the resulted system at 60° C. A molar ratio of water to total metal elements was 1.1:1, and a mass ratio of n-propanol to water was 7:1. Then, refluxing was performed for 2 hours, followed by atmospheric distillation to obtain a metal alkoxide copolymer.

(4) Preparation of a precursor: The metal alkoxide copolymer obtained in step (3) was uniformly mixed with allyl-functional novolac resin. A ratio of a total molar quantity of metal elements in the alkoxide copolymer to a mass of the allyl-functional novolac resin was 1 mol:19.5 g. The resultant mixture was heated to 80° C. and reacted for 1 hour, and then cooled to obtain a high-entropy carbide ceramic precursor.

Figure 9:
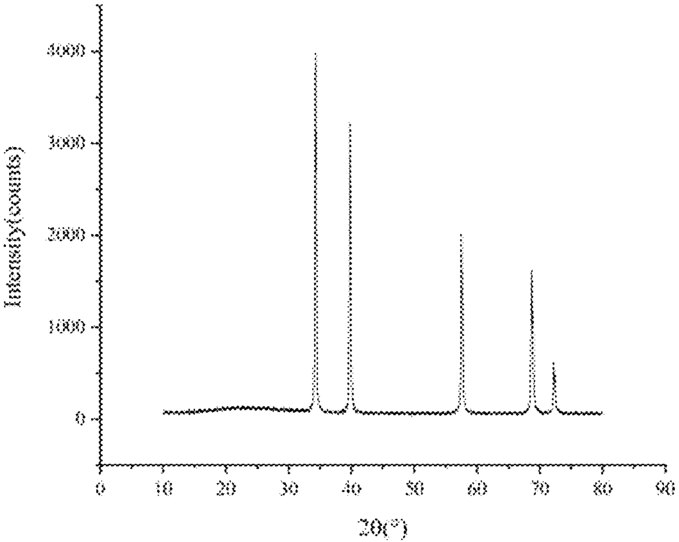
FIG. 9 is an XRD pattern of a ceramic obtained in Example 7.

The obtained precursor was heated and cured in an oven, then pyrolyzed at 1800° C. for 2 hours in a high-temperature furnace under vacuum, and cooled to obtain (TiZrHfTaNb)$C_5$ high-entropy ceramic. The XRD pattern of the ceramic is shown in FIG. 9. The XRD pattern presents only one set of diffraction peaks, indicating occurrence of solutionizing which enables metal atoms to be completely solutionized into one crystal lattice, and the system does not contain oxide impurities.

Example 8

In this example, a precursor and a high-entropy ceramic are prepared using the following methods.

(1) Obtaining metal alkoxides: Metal alkoxides Hf(Oi-Pr)$_4$, Ti(OPr)$_4$, Ta($OCH_2CH_2OCH_3$)$_5$, Mo($OCH_2CH_2OCH_2CH_3$)$_5$, and Nb(OPr)$_5$ were obtained. Among them, Mo($OCH_2CH_2OCH_2CH_3$)$_5$ was prepared by the method as used in Example 1; Hf(Oi-Pr)$_4$ and Ta($OCH_2CH_2OCH_3$)$_5$ were prepared by the method as used in Example 3; and Nb(OPr)$_5$ was prepared by the method as used in Example 5.

(2) Preparing metal alkoxide complexes: Acetylacetone was added dropwise into each of the metal alkoxides Hf(Oi-Pr)$_4$, Ti(OPr)$_4$, Ta($OCH_2CH_2OCH_3$)$_5$, Mo($OCH_2CH_2OCH_2CH_3$)$_5$, and Nb(OPr)$_5$ at 50° C., followed by stirring for 1 hour. Molar ratios of the metal alkoxides Hf(Oi-Pr)$_4$, Ti(OPr)$_4$, Ta($OCH_2CH_2OCH_3$)$_5$, Mo($OCH_2CH_2OCH_2CH_3$)$_5$, and Nb(OPr)$_5$ to acetylacetone were 1:1.1, 1:0.8, 1:1, 1:2, and 1:1.5, respectively.

(3) Cohydrolysis: The metal alkoxide complexes obtained in step (2) were uniformly mixed in an equal metal molar ratio. A mixture of water and n-propanol was added dropwise into the system at 70° C. A molar ratio of water to total metal elements was 1.2:1, and a mass ratio of n-propanol to water was 8:1. Then, refluxing was performed for 2 hours, followed by atmospheric distillation to obtain a metal alkoxide copolymer.

(4) Preparation of a precursor: The metal alkoxide copolymer obtained in step (3) was uniformly mixed with allyl-functional novolac resin. A ratio of a total molar quantity of metal elements in the alkoxide copolymer to a mass of the allyl-functional novolac resin was 1 mol:19.5 g. The resultant mixture was heated to 80° C. and reacted for 1 hour, and then cooled to obtain a high-entropy carbide ceramic precursor.

Figure 10:
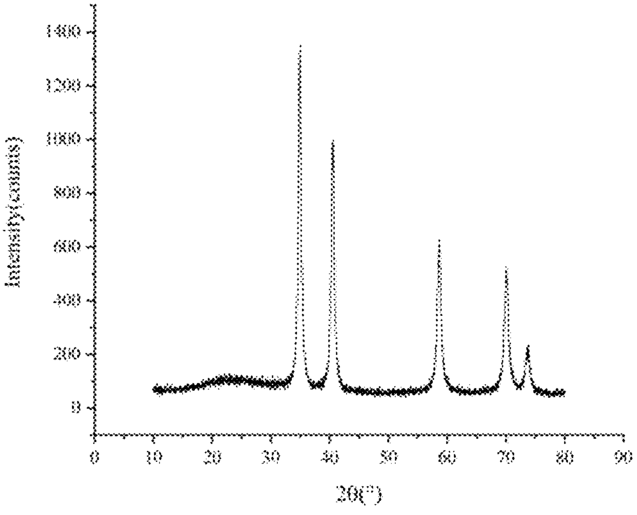
FIG. 10 is an XRD pattern of a ceramic obtained in Example 8.

The obtained precursor was heated and cured in an oven, then pyrolyzed at 1450° C. for 2 hours in a high-temperature furnace under vacuum, and cooled to obtain (TiHfNbTaMo)$C_5$ high-entropy ceramic. The XRD pattern of the ceramic is shown in FIG. 10. The XRD pattern presents only one set of diffraction peaks, indicating occurrence of solutionizing which enables metal atoms to be completely solutionized into one crystal lattice, and the system does not contain oxide impurities.

Comparative Example 1

Implementation of this comparative example was the same as that of Example 2 except that the molar ratio of Ti(Oi-Pr)$_4$ to acetylacetone in step (2) was adjusted to 1:2.1.

Comparative Example 2

Implementation of this comparative example was the same as that of Example 3 except that the molar ratio of Hf(Oi-Pr)$_4$ to ethyl acetoacetate in step (2) was adjusted to 1:0.5.

Comparative Example 3

Implementation of this comparative example was the same as that of Example 2 except that the molar ratio of water to total metal elements in step (3) was adjusted to 1.4:1.

Comparative Example 4

Implementation of this comparative example was the same as that of Example 3 except that the molar ratio of water to total metal elements in step (3) was adjusted to 0.7:1.

Experimental Example 9

This experimental example studied the storage stability of the high-entropy ceramic precursors by the following test method. Initial viscosity of the precursors prepared in the examples and comparative examples of the present invention, as well as viscosity of the precursors after being stored at room temperature for 12 months were measured, and a comparative analysis of viscosity change rates was conducted. This experimental example also recorded the morphology and properties of the precursors prepared in the examples and comparative examples during and at the end of the reaction processes, which are shown in the following table.

| Precursors | Initial viscosity (mPa · S) | Viscosity after storage for 12 months (mPa · S) | Viscosity change rate (%) | Morphology and properties |
|---|---|---|---|---|
| Example 1 | 80.2 | 83.6 | 4.2% | A homogeneous and soluble copolymer was formed. |
| Example 2 | 82.1 | 85.2 | 3.8% | A homogeneous and soluble copolymer was formed. |
| Example 3 | 90.5 | 93.8 | 3.7% | A homogeneous and soluble copolymer was formed. |
| Example 4 | 84.9 | 87.1 | 2.6% | A homogeneous and soluble copolymer was formed. |
| Example 5 | 100.3 | 102.5 | 2.2% | A homogeneous and soluble copolymer was formed. |
| Example 6 | 96.6 | 98.9 | 2.4% | A homogeneous and soluble copolymer was formed. |
| Example 7 | 87.4 | 91.4 | 4.6% | A homogeneous and soluble copolymer was formed. |
| Example 8 | 93.7 | 99.1 | 5.8% | A homogeneous and soluble copolymer was formed. |
| Comparative Example 1 | 88.9 | — | — | The system gelled after 6 months, and the viscosity could not be measured. |
| Comparative Example 2 | — | — | — | Partial precipitation occurred, and a homogeneous and soluble copolymer could not be formed. |
| Comparative Example 3 | — | — | — | Partial precipitation occurred, and a homogeneous and soluble copolymer could not be formed. |
| Comparative Example 4 | 98.7 | — | — | The system gelled after 4 months, and the viscosity could not be measured. |

As can be seen from the above table, the precursors provided in Examples 1 to 8 of the present invention are all metal-containing copolymers exhibiting a uniform elements distribution and easily soluble in conventional organic reagents. In each of Comparative Examples 1 and 2, the ratio of the metal alkoxide to the complexing agent is adjusted. When the complexing agent is used in a relatively low content, the rate of the subsequent hydrolysis reaction is relatively fast, and precipitation occurs during the reaction, making it impossible to obtain a soluble precursor with uniform elements distribution. When the complexing agent is used in a relatively high content, the rate of the hydrolysis is so slow that the reaction is incomplete, causing remaining of a large number of alkoxy groups, which leads to instability of the precursor and therefore gelation during storage thereof. Similarly, in each of Comparative Examples 3 and 4, the proportion of water in the hydrolysis process is adjusted compared with that in the examples, making the hydrolysis reaction too fast or incomplete, thus making it impossible to prepare a precursor having uniformly elements distribution and suitable for long-term storage.

Example 10

In this example, a precursor and a high-entropy ceramic are prepared using the following methods.

(1) Obtaining metal alkoxides: Metal alkoxides $Zr(OPr)_4$, $Hf(OPr)_4$, $Ta(OPr)_5$, and $Ti(OPr)_4$ were selected. Among them, $Hf(OPr)_4$ and $Ta(OPr)_5$ were prepared as follows. Metal salts $HfCl_4$ and $TaCl_5$ were dispersed in n-heptane and ethylene glycol dimethyl ether, respectively, into each of which a monohydric alcohol n-propanol was added at −10° C., followed by adding triethylamine dropwise. After that, each mixtures were refluxed for 1 hour and then filtered to obtain respective metal alkoxide solutions, and metal alkoxides were obtained after reduced pressure distillation respectively. Ratios of the metal salts to the respective monohydric alcohols to triethylamine were 1:4:4 and 1:5:6, respectively.

(2) Preparation of metal alkoxide complexes: Acetylacetone was added dropwise into each of the metal alkoxides $Zr(OPr)_4$, $Hf(OPr)_4$, $Ta(OPr)_5$, and $Ti(OPr)_4$ at 40° C., followed by stirring for 0.1 hour. Molar ratios of the metal alkoxides $Zr(OPr)_4$, $Hf(OPr)_4$, $Ta(OPr)_5$, and $Ti(OPr)_4$ to acetylacetone were 1:0.8, 1:1, 1:1, and 1:1.5, respectively.

(3) Cohydrolysis: The transition metal alkoxide complexes obtained in step (2) were uniformly mixed in an equal metal molar ratio to obtain a mixture of alkoxides. N-propanol, with a total molar quantity ten times to that of La and Y elements, was added into the mixture of $La(acac)_3$ and $Y(acac)_3$, molar quantities of La and Y being the same with that of single metal element in the mixture of alkoxides, followed by refluxing the resulted mixture for 2 hours, and then cooling to room temperature to obtain a rare earth compound-containing solution. The mixture of alkoxides and the rare earth compound-containing solution were mixed uniformly. A mixture of water and n-propanol was added dropwise into the resulted system at room temperature, with a molar ratio of water to total metal elements being 0.8:1, and a mass ratio of n-propanol to water being 8:1. Then, refluxing was performed for 5 hours, followed by atmospheric distillation to obtain a metal copolymer.

(4) Preparation of a precursor: The metal copolymer prepared in step (3) was uniformly mixed with allyl-functional novolac resin. A ratio of a total molar quantity of metal elements in the metal copolymer to a mass of the allyl-functional novolac resin was 1 mol:13 g. The resultant mixture was heated to 80° C. and reacted for 1 hour, and then cooled to obtain a rare earth-containing high-entropy carbide ceramic precursor.

Figure 11:
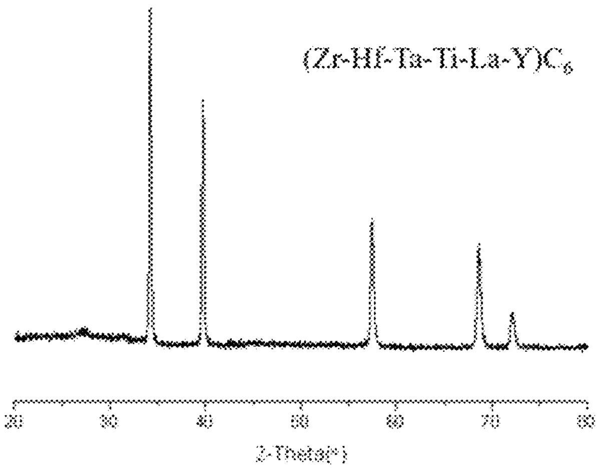
FIG. 11 is an XRD pattern of a high-entropy ceramic obtained in Example 10.
Figure 12:
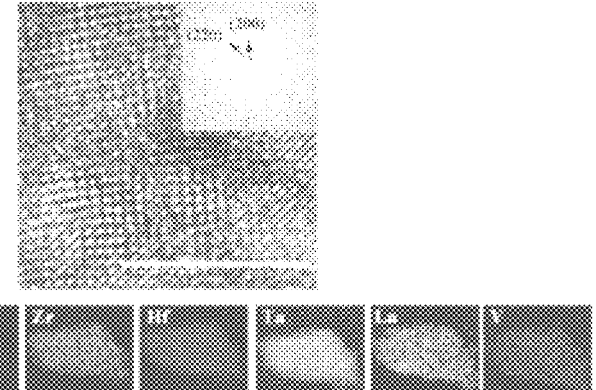
FIG. 12 is a TEM image and a TEM-EDS image of the high-entropy ceramic obtained in Example 10.

The obtained precursor was heated and cured in an oven, then polysized at 1700° C. for 2 hours in a high-temperature furnace under vacuum, and cooled to obtain $(ZrHfTaTiLaY)C_6$ high-entropy ceramic. The XRD pattern of the ceramic is shown in FIG. 11. As can be seen from the figure, metal atoms are completely solutionized into one crystal lattice, and the system does not contain oxide impurities. A TEM image and a TEM-EDS image of the ceramic are shown in FIG. 12. It can be seen from the figure that metal atoms are distributed uniformly.

Example 11

In this example, a precursor and a high-entropy ceramic are prepared using the following methods.

(1) Obtaining metal alkoxides: Metal alkoxides $Zr(OPr)_4$, $Hf(OPr)_4$, $Ti(Oi\text{-}Pr)_4$, $Ta(OCH_2CH_2OCH_2CH_3)_5$, and $Nb(OCH_2CH_2OCH_3)_5$ were selected. Among them, $Hf(OPr)_4$, $Ta(OCH_2CH_2OCH_2CH_3)_5$, and $Nb(OCH_2CH_2OCH_3)_5$ were prepared as follows. Metal salts $HfCl_4$, $TaCl_5$, and $NbCl_5$ were dispersed in n-heptane, n-hexane, and ethylene glycol dimethyl ether respectively to obtain respective mixtures, into which monohydric alcohols n-propanol, ethylene glycol ethyl ether, and ethylene glycol methyl ether were respectively added at −10° C., followed by adding triethylamine dropwise. After that, each mixtures were refluxed for 1 hour and then filtered to obtain respective metal alkoxide solutions, and metal alkoxides were obtained after reduced pressure distillation respectively. Ratios of the metal salts to the respective monohydric alcohols to triethylamine were 1:4:4, 1:5:6, and 1:6:6, respectively.

(2) Preparation of metal alkoxide complexes: Acetylacetone was added dropwise into each of the metal alkoxides $Zr(OPr)_4$, $Hf(OPr)_4$, $Ti(Oi\text{-}Pr)_4$, $Ta(OCH_2CH_2OCH_2CH_3)_5$, and $Nb(OCH_2CH_2OCH_3)_5$ at 80° C., followed by stirring for 0.1 hour. Molar ratios of the metal alkoxides $Zr(OPr)_4$, $Hf(OPr)_4$, $Ti(Oi\text{-}Pr)_4$, $Ta(OCH_2CH_2OCH_2CH_3)_5$, and $Nb(OCH_2CH_2OCH_3)_5$ to acetylacetone were 1:1, 1:0.6, 1:2, 1:1, and 1:2, respectively.

(3) Cohydrolysis: The transition metal alkoxide complexes prepared in step (2) were selected and uniformly mixed in an equal metal molar ratio to obtain a mixture of alkoxides. N-propanol, with a total molar quantity five times to that of La and Y elements, was added into the mixture of $La(acac)_3$ and $Y(acac)_3$, molar quantities of La and Y being the same with that of a single metal element in the mixture of alkoxides, followed by refluxing the resulted mixture for 0.5 hour, and then cooling to room temperature to obtain a rare earth compound-containing solution. The mixture of alkoxides and the rare earth compound-containing solution were mixed uniformly. A mixture of water and n-propanol was added dropwise into the resulted system at 90° C., with a molar ratio of water to total metal elements being 1.3:1, and a mass ratio of n-propanol to water being 3:1. Then, refluxing was performed for 2 hours, followed by atmospheric distillation to obtain a metal copolymer.

(4) Preparation of a precursor: The metal copolymer prepared in step (3) was uniformly mixed with allyl-functional novolac resin. A ratio of a total molar quantity of metal elements in the metal copolymer to a mass of the allyl-functional novolac resin was 1 mol:15 g. The resultant mixture was heated to 50° C. and reacted for 4 hours, and then cooled to obtain a high-entropy carbide ceramic precursor.

Figure 13:
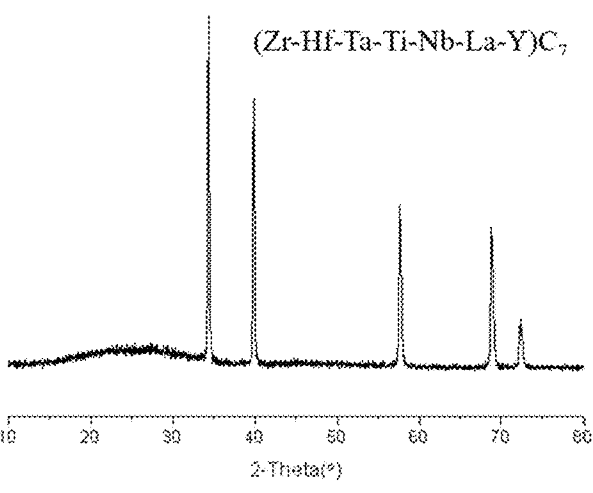
FIG. 13 is an XRD pattern of a high-entropy ceramic obtained in Example 11.
Figure 14:
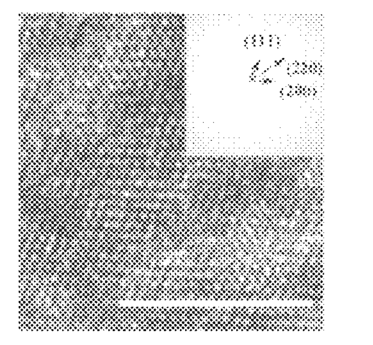
FIG. 14 is a TEM image and a TEM-EDS image of the high-entropy ceramic obtained in Example 11.
Figure 14:
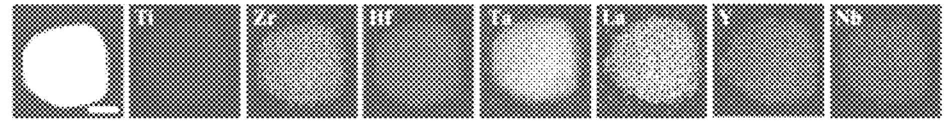

The obtained precursor was heated and cured in an oven, then pyrolyzed at 1800° C. for 2 hours in a high-temperature furnace under argon, and cooled to obtain $(ZrHfTaTiNbLaY)C_7$ high-entropy ceramic. The XRD pattern of the ceramic is shown in FIG. 13. As can be seen from the figure, metal atoms are completely solutionized into one crystal lattice, and the system does not contain oxide impurities. A TEM image and a TEM-EDS image of the ceramic are shown in FIG. 14. It can be seen from the figure that metal atoms are distributed uniformly.

Example 12

In this example, a precursor and a high-entropy ceramic are prepared using the following methods.

(1) Obtaining metal alkoxides: Metal alkoxides $Zr(OPr)_4$, $Hf(OPr)_4$, $Ti(Oi\text{-}Pr)_4$, $Ta(OPr)_5$, $Mo(OCH_2CH_2OCH_2CH_3)_5$, and $W(OCH_2CH_2OCH_3)_6$ were selected. Among them, $Hf(OPr)_4$, $Ta(OPr)_5$, $Mo(OCH_2CH_2OCH_2CH_3)_5$, and $W(OCH_2CH_2OCH_3)_6$ were prepared as follows. Metal salts $HfCl_4$, $TaCl_5$, $MoCl_5$, and $WCl_6$ each were dispersed in toluene to obtain respective mixtures, into which monohydric alcohols n-propanol, n-propanol, ethylene glycol ethyl ether, and ethylene glycol methyl ether were respectively added at −5° C., followed by adding triethylamine dropwise. After that, each mixtures were refluxed for 1 hour and then filtered to obtain respective metal alkoxide solutions. Ratios of the metal salts to the respective monohydric alcohols to triethylamine were 1:4:4, 1:5:6, 1:6:5, and 1:8:7, respectively.

(2) Preparation of metal alkoxide complexes: Acetylacetone was added dropwise into each of the metal alkoxides $Zr(OPr)_4$, $Hf(OPr)_4$, $Ti(Oi\text{-}Pr)_4$, $Ta(OPr)_5$, $Mo(OCH_2CH_2OCH_2CH_3)_5$, and $W(OCH_2CH_2OCH_3)_6$ at 80° C., followed by stirring for 2 hours. Molar ratios of the metal alkoxides $Zr(OPr)_4$, $Hf(OPr)_4$, $Ti(Oi\text{-}Pr)_4$, $Ta(OPr)_5$, $Mo(OCH_2CH_2OCH_2CH_3)_5$, and $W(OCH_2CH_2OCH_3)_6$ to acetylacetone were 1:1, 1:0.8, 1:2, 1:1, 1:2, and 1:2.5, respectively.

(3) Cohydrolysis: The transition metal alkoxide complexes prepared in step (2) were selected and uniformly mixed in an equal metal molar ratio to obtain a mixture of alkoxides. N-propanol, with a total molar quantity eight times to that of La element, was added into $La(acac)_3$, with a molar quantity of La being the same with that of a single metal element in the mixture of alkoxides, followed by refluxing the resulted mixture for 2 hours, and then cooling to room temperature to obtain a rare earth compound-containing solution. The mixture of alkoxides and the rare earth compound-containing solution were mixed uniformly. A mixture of water and n-propanol was added dropwise into the resulted system at 60° C., with a molar ratio of water to total metal elements being 1.3:1, and a mass ratio of n-propanol to water being 6:1. Then, refluxing was performed for 2 hours, followed by atmospheric distillation to obtain a metal copolymer.

(4) Preparation of a precursor: The metal copolymer prepared in step (3) was uniformly mixed with allyl-functional novolac resin. A ratio of a total molar quantity of metal elements in the metal copolymer to a mass of the allyl-functional novolac resin was 1 mol:14 g. The resultant mixture was heated to 50° C. and reacted for 4 hours, and then cooled to obtain a high-entropy carbide ceramic precursor.

Figure 15:
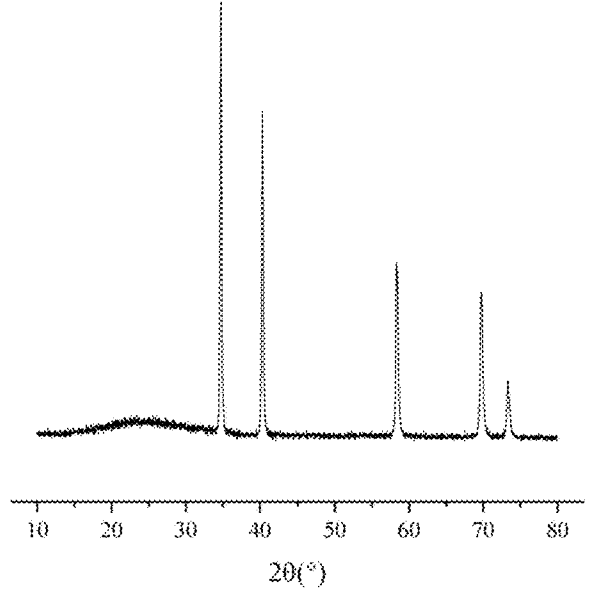
FIG. 15 is an XRD pattern of a high-entropy ceramic obtained in Example 12.
Figure 16:
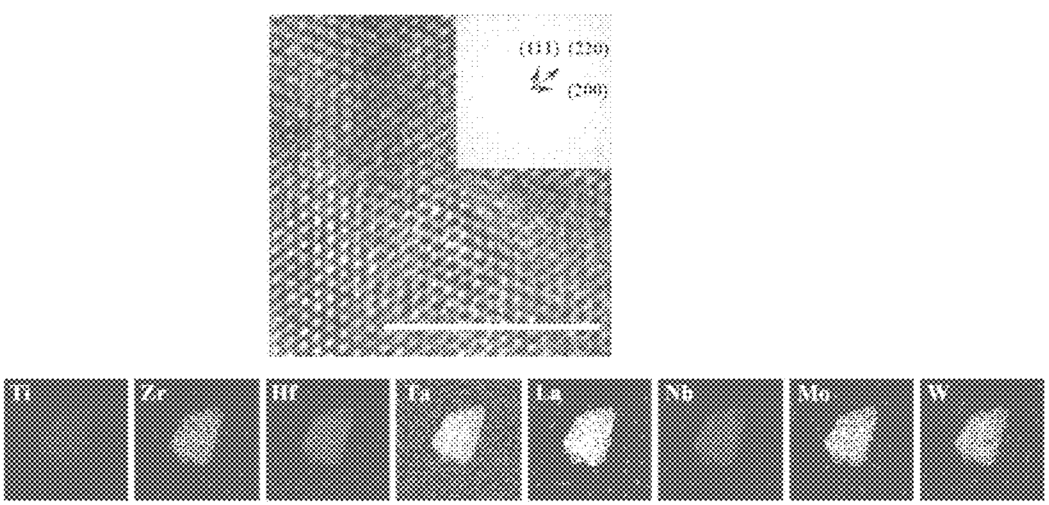
FIG. 16 is a TEM image and a TEM-EDS image of the high-entropy ceramic obtained in Example 12.

The obtained precursor was heated and cured in an oven, then pyrolyzed at 1800° C. for 2 hours in a high-temperature furnace under argon, and cooled to obtain $(TiZrHfTaMoWLa)C_7$ high-entropy ceramic. The XRD pattern of the ceramic is shown in FIG. 15. As can be seen from the figure, metal atoms are completely solutionized into one crystal lattice, and the system does not contain oxide impurities. A TEM image and a TEM-EDS image of the ceramic are shown in FIG. 16. It can be seen from the figure that metal atoms are distributed uniformly.

Example 13

In this example, a precursor and a high-entropy ceramic are prepared using the following methods.

(1) Obtaining metal alkoxides: Metal alkoxides $Hf(OPr)_4$, $Ti(Oi\text{-}Pr)_4$, $V(OCH_2CH_2OCH_3)_5$, and $Nb(OCH_2CH_2OCH_3)_5$ were selected. Among them, $Hf(OPr)_4$, $V(OCH_2CH_2OCH_3)_5$, and $Nb(OCH_2CH_2OCH_3)_5$ were prepared as follows. Metal salts $HfCl_4$, $VCl_5$, and $NbCl_5$ were dispersed in n-heptane, ethylene glycol dimethyl ether, and ethylene glycol dimethyl ether respectively to obtain respective mixtures, into which monohydric alcohols n-propanol, ethylene glycol methyl ether, and ethylene glycol methyl ether were respectively added at 5° C., followed by adding triethylamine dropwise. After that, each mixtures were refluxed for 5 hours and then filtered to obtain respective metal alkoxide solutions, and metal alkoxides were obtained after reduced pressure distillation respectively. Ratios of the metal salts to the respective monohydric alcohols to triethylamine were 1:8:6, 1:10:7.5, and 1:5:7.5, respectively.

(2) Preparation of metal alkoxide complexes: Acetylacetone was added dropwise into each of the metal alkoxides $Hf(OPr)_4$, $Ti(Oi\text{-}Pr)_4$, $V(OCH_2CH_2OCH_3)_5$, and $Nb(OCH_2CH_2OCH_3)_5$ at 50° C., followed by stirring for 0.1 hour. Molar ratios of the metal alkoxides $Hf(OPr)_4$, $Ti(Oi\text{-}Pr)_4$, $V(OCH_2CH_2OCH_3)_5$, and $Nb(OCH_2CH_2OCH_3)_5$ to acetylacetone were 1:2, 1:0.6, 1:2.5, and 1:0.75, respectively.

(3) Cohydrolysis: The transition metal alkoxide complexes prepared in step (2) were selected and uniformly mixed in an equal metal molar ratio to obtain a mixture of alkoxides. A mixture of methanol and ethanol, with a total molar quantity seven times to that of La element, was added into $La(acac)_3$, a molar quantity of La being the same with that of single metal element in the mixture of alkoxides, followed by refluxing the resulted mixture for 3 hours, and then cooling to room temperature to obtain a rare earth compound-containing solution. The mixture of alkoxides and the rare earth compound-containing solution were mixed uniformly. A mixture of water, methanol, and ethanol was added dropwise into the resulted system at 60° C., with a molar ratio of water to total metal elements being 1.1:1, and a mass ratio of the alcohols to water being 4:1. Then, refluxing was performed for 5 hours, followed by atmospheric distillation to obtain a metal copolymer.

(4) Preparation of a precursor: The metal copolymer prepared in step (3) was uniformly mixed with allyl-functional novolac resin. A ratio of a total molar quantity of metal elements in the metal copolymer to a mass of the allyl-functional novolac resin was 1 mol:13 g. The resultant mixture was heated to 90° C. and reacted for 0.5 hour, and then cooled to obtain a high-entropy carbide ceramic precursor.

The obtained precursor was heated and cured in an oven, then pyrolyzed at 1750° C. for 2.5 hours in a high-temperature furnace under vacuum, and cooled to obtain $(HfTiNbVLa)C_5$ high-entropy ceramic.

Example 14

In this example, a precursor and a high-entropy ceramic are prepared using the following methods.

(1) Obtaining metal alkoxides: Metal alkoxides $Zr(OPr)_4$, $Ta(OCH_2CH_2OCH_2CH_3)_5$, $Nb(OCH_2CH_2OCH_3)_5$, and $Mo(OCH_2CH_2OCH_2CH_3)_5$ were selected. Among them, $Ta(OCH_2CH_2OCH_2CH_3)_5$, $Nb(OCH_2CH_2OCH_3)_5$, and $Mo(OCH_2CH_2OCH_2CH_3)_5$ were prepared as follows. Metal salts $TaCl_5$, $NbCl_5$, and $MoCl_5$ were dispersed in n-heptane, n-hexane, and tert-butyl methyl ether respectively to obtain respective mixtures, into which ethylene glycol ethyl ether, ethylene glycol methyl ether, and ethylene glycol ethyl ether were respectively added at 1° C., followed by adding triethylamine dropwise. After that, each mixtures were refluxed for 3 hours and then filtered to obtain respective metal alkoxide solutions, and metal alkoxides were obtained after reduced pressure distillation respectively. Ratios of the metal salts to the respective monohydric alcohols to triethylamine were 1:7:6, 1:7.5:7.5, and 1:5:5, respectively.

(2) Preparation of metal alkoxide complexes: Ethyl acetoacetate was added dropwise into each of the metal alkoxides $Zr(OPr)_4$, $Ta(OCH_2CH_2OCH_2CH_3)_5$, $Nb(OCH_2CH_2OCH_3)_5$, and $Mo(OCH_2CH_2OCH_2CH_3)_5$ at 70° C., followed by stirring for 2 hours. Molar ratios of the metal alkoxides $Zr(OPr)_4$, $Ta(OCH_2CH_2OCH_2CH_3)_5$, $Nb(OCH_2CH_2OCH_3)_5$, and $Mo(OCH_2CH_2OCH_2CH_3)_5$ to acetylacetone were 1:1.2, 1:1.5, 1:2, and 1:1.25, respectively.

(3) Cohydrolysis: The transition metal alkoxide complexes prepared in step (2) were selected and uniformly mixed in an equal metal molar ratio to obtain a mixture of alkoxides. A mixture of ethylene glycol methyl ether and ethylene glycol ethyl ether, with a total molar quantity nine times the same to that of Y element, was added into $Y(acac)_3$, a molar quantity of Y being the same with that of single metal element in the mixture of alkoxides, followed by refluxing the resulted mixture under heating for 5 hours, and then cooling to room temperature to obtain a rare earth compound-containing solution. The mixture of alkoxides and the rare earth compound-containing solution were mixed uniformly. A mixture of water, ethylene glycol methyl ether, and ethylene glycol ethyl ether was added dropwise into the system at room temperature, with a molar ratio of water to total metal elements being 0.9:1, and a mass ratio of the alcohols to water being 7:1. Then, refluxing was performed for 1 hour, followed by atmospheric distillation to obtain a metal copolymer.

(4) Preparation of a precursor: The metal copolymer prepared in step (3) was uniformly mixed with allyl-functional novolac resin. A ratio of a total molar quantity of metal elements in the metal copolymer to a mass of the allyl-functional novolac resin was 1 mol:15 g. The resultant mixture was heated to 70° C. and reacted for 2 hours, and then cooled to obtain a high-entropy carbide ceramic precursor.

The obtained precursor was heated and cured in an oven, then pyrolyzed at 2000° C. for 0.5 hour in a high-temperature furnace under nitrogen, and cooled to obtain $(ZrTaNbMoY)C_5$ high-entropy ceramic.

Example 15

In this example, a precursor and a high-entropy ceramic are prepared using the following methods.

(1) Obtaining metal alkoxides: Metal alkoxides hafnium n-butoxide, $Ta(OPr)_5$, $Mo(OCH_2CH_2OCH_2CH_3)_5$, and $W(OCH_2CH_2OCH_3)_6$ were selected. Among them, hafnium n-butoxide, $Ta(OPr)_5$, $Mo(OCH_2CH_2OCH_2CH_3)_5$, and $W(OCH_2CH_2OCH_3)_6$ were prepared as follows. Metal salts $HfCl_4$, $TaCl_5$, $MoCl_5$, and $WCl_6$ were dispersed in toluene, n-hexane, n-heptane, and xylene respectively to obtain respective mixtures, into which monohydric alcohols n-butanol, n-propanol, ethylene glycol ethyl ether, and ethylene glycol methyl ether were respectively added at −5° C., followed by adding triethylamine dropwise. After that, each mixtures were refluxed for 2 hours and then filtered to obtain respective metal alkoxide solutions, and metal alkoxides were obtained after reduced pressure distillation respectively. Ratios of the metal salts to the respective monohydric alcohols to triethylamine were 1:6:5, 1:8:6, 1:6:5, 1:12:9, respectively.

(2) Preparation of metal alkoxide complexes: Acetylacetone was added dropwise into each of the metal alkoxides hafnium n-butoxide, $Ta(OPr)_5$, $Mo(OCH_2CH_2OCH_2CH_3)_5$, and $W(OCH_2CH_2OCH_3)_6$ at room temperature, followed by stirring for 5 hours. Molar ratios of the metal alkoxides hafnium n-butoxide, $Ta(OPr)_5$, $Mo(OCH_2CH_2OCH_2CH_3)_5$, and $W(OCH_2CH_2OCH_3)_6$ to acetylacetone were 1:1, 1:1.5, 1:2, and 1:0.9, respectively.

(3) Cohydrolysis: The transition metal alkoxide complexes prepared in step (2) were selected and uniformly mixed in an equal metal molar ratio to obtain a mixture of alkoxides. A mixture of n-butanol and n-propanol, with a total molar quantity five times to that of La element, was added into $La(acac)_3$, a molar quantity of La being the same with that of single metal element in the mixture of alkoxides, followed by refluxing the resulted mixture under heating for 4 hours, and then cooling to room temperature to obtain a rare earth compound-containing solution. The mixture of alkoxides and the rare earth compound-containing solution were mixed uniformly. A mixture of water, n-butanol, and n-propanol was added dropwise into the system at room temperature, with a molar ratio of water to total metal elements being 1:1, and a mass ratio of the alcohols to water being 3:1. Then, refluxing was performed for 5 hours, followed by atmospheric distillation to obtain a metal copolymer.

(4) Preparation of a precursor: The metal copolymer prepared in step (3) was uniformly mixed with allyl-functional novolac resin. A ratio of a total molar quantity of metal elements in the metal copolymer to a mass of the allyl-functional novolac resin was 1 mol:14 g. The resultant mixture was heated to 60° C. and reacted for 1.5 hours, and then cooled to obtain a high-entropy carbide ceramic precursor.

The obtained precursor was heated and cured in an oven, then pyrolyzed at 1900° C. for 1 hour in a high-temperature furnace under argon, and cooled to obtain $(HfTaMoWLa)C_5$ high-entropy ceramic.

Example 16

In this example, a precursor and a high-entropy ceramic are prepared using the following methods.

(1) Obtaining metal alkoxides: Metal alkoxides $Zr(OPr)_4$, hafnium isobutoxide, $Nb(OCH_2CH_2OCH_3)_5$, and $W(OCH_2CH_2OCH_3)_6$ were selected. Among them, hafnium isobutoxide, $Nb(OCH_2CH_2OCH_3)_5$, and $W(OCH_2CH_2OCH_3)_6$ were prepared as follows. Metal salts $HfCl_4$, $NbCl_5$, and $WCl_6$ were dispersed in n-hexane, n-heptane, and tert-butyl methyl ether respectively to obtain respective mixtures, into which isobutanol, ethylene glycol methyl ether, and ethylene glycol methyl ether were respectively added at 0° C., followed by adding triethylamine dropwise. After that, each mixtures were refluxed for 1 hour and then filtered to obtain respective metal alkoxide solutions, and metal alkoxides were obtained after reduced pressure distillation respectively. Ratios of the metal salts to the respective monohydric alcohols to triethylamine were 1:8:6, 1:5:5, and 1:7.5:7.5, respectively.

(2) Preparation of metal alkoxide complexes: Acetylacetone was added dropwise into each of the metal alkoxides $Zr(OPr)_4$, hafnium isobutoxide, $Nb(OCH_2CH_2OCH_3)_5$, and $W(OCH_2CH_2OCH_3)_6$ at 40° C., followed by stirring for 2 hours. Molar ratios of the metal alkoxides $Zr(OPr)_4$, hafnium isobutoxide, $Nb(OCH_2CH_2OCH_3)_5$, and $W(OCH_2CH_2OCH_3)_6$ to acetylacetone were 1:0.8, 1:2, 1:2, and 1:3, respectively.

(3) Cohydrolysis: The transition metal alkoxide complexes prepared in step (2) were selected and uniformly mixed in an equal metal molar ratio to obtain a mixture of alkoxides. A mixture of isobutanol and n-propanol, with a total molar quantity seven times to that of Y element, was added into $Y(acac)_3$, a molar quantity of Y being the same with that of single metal element in the mixture of alkoxides, followed by refluxing the resulted mixture for 1.5 hours, and then cooling to room temperature to obtain a rare earth compound-containing solution. The mixture of alkoxides and the rare earth compound-containing solution were mixed uniformly. A mixture of water, n-butanol, and n-propanol was added dropwise into the system at 60° C., with a molar ratio of water to total metal elements being 0.8:1, and a mass ratio of the alcohols to water being 8:1. Then, refluxing was performed for 2 hours, followed by atmospheric distillation to obtain a metal copolymer.

(4) Preparation of a precursor: The metal copolymer prepared in step (3) was uniformly mixed with allyl-functional novolac resin. A ratio of a total molar quantity of metal elements in the metal copolymer to a mass of the allyl-functional novolac resin was 1 mol:13 g. The resultant mixture was heated to 80° C. and reacted for 1 hour, and then cooled to obtain a high-entropy carbide ceramic precursor.

The obtained precursor was heated and cured in an oven, then pyrolyzed at 1850° C. for 3.5 hours in a high-temperature furnace under vacuum, and cooled to obtain $(ZrHfNbWY)C_5$ high-entropy ceramic.

Example 17

In this example, a precursor and a high-entropy ceramic are prepared using the following methods.

(1) Obtaining metal alkoxides: Metal alkoxides $Ti(Oi\text{-}Pr)_4$, $Ta(OPr)_5$, $Mo(OCH_2CH_2OCH_2CH_3)_5$, and $W(OCH_2CH_2OCH_3)_6$ were selected. Among them, $Ta(OPr)_5$, $Mo(OCH_2CH_2OCH_2CH_3)_5$, and $W(OCH_2CH_2OCH_3)_6$ were prepared as follows. Metal salts $TaCl_5$, $MoCl_5$, and $WCl_6$ were dispersed in n-heptane, toluene, and xylene respectively to obtain respective mixtures, into which monohydric alcohols n-propanol, ethylene glycol ethyl ether, and ethylene glycol methyl ether were respectively added at −8° C., followed by adding triethylamine dropwise. After that, each mixtures were refluxed for 2 hours and then filtered to obtain respective metal alkoxide solutions, and metal alkoxides were obtained after reduced pressure distillation respectively. Ratios of the metal salts to the respective monohydric alcohols to triethylamine were 1:10:7, 1:8:6, and 1:7:6, respectively.

(2) Preparation of metal alkoxide complexes: Acetylacetone was added dropwise into each of the metal alkoxides $Ti(Oi\text{-}Pr)_4$, $Ta(OPr)_5$, $Mo(OCH_2CH_2OCH_2CH_3)_5$, and $W(OCH_2CH_2OCH_3)_6$ at room temperature, followed by stirring for 5 hours. Molar ratios of the metal alkoxides $Ti(Oi\text{-}Pr)_4$, $Ta(OPr)_5$, $Mo(OCH_2CH_2OCH_2CH_3)_5$, and $W(OCH_2CH_2OCH_3)_6$ to acetylacetone were 1:0.6, 1:2.5, 1:1, and 1:0.9, respectively.

(3) Cohydrolysis: The transition metal alkoxide complexes prepared in step (2) were selected and uniformly mixed in a molar ratio of Ta:Ti:Mo:W=35:5:20:15 to obtain a mixture of alkoxides. N-propanol, with a total molar quantity five times to that of La and Y elements, was added into a mixture of $La(acac)_3$ and $Y(acac)_3$, a ratio of molar quantities of La and Y to the metal elements in the mixture of alkoxides being Ta:Ti:Mo:W:La:Y=35:5:20:15:15:10, followed by refluxing the resulted mixture under heating for 5 hours, and then cooling to room temperature to obtain a rare earth compound-containing solution. The mixture of alkoxides and the rare earth compound-containing solution were mixed uniformly. A mixture of water, n-butanol, and n-propanol was added dropwise into the system at room temperature, with a molar ratio of water to total metal elements being 1.2:1, and a mass ratio of the alcohols to water being 8:1. Then, refluxing was performed for 5 hours, followed by atmospheric distillation to obtain a metal copolymer.

(4) Preparation of a precursor: The metal copolymer prepared in step (3) was uniformly mixed with allyl-functional novolac resin. A ratio of a total molar quantity of metal elements in the alkoxide copolymer to a mass of the allyl-functional novolac resin was 1 mol:13 g. The resultant mixture was heated to 50° C. and reacted for 4 hours, and then cooled to obtain a high-entropy carbide ceramic precursor.

The obtained precursor was heated and cured in an oven, then pyrolyzed at 2000° C. for 1 hour in a high-temperature furnace under vacuum, and cooled to obtain a high-entropy carbide ceramic containing elements Ta, Ti, Mo, W, La, and Y.

Comparative Example 5

Implementation of this comparative example was the same as that of Example 11 except that the molar ratio of $Hf(OPr)_4$ to acetylacetone in step (2) was adjusted to 1:0.5.

Comparative Example 6

Implementation of this comparative example was the same as that of Example 16 except that the molar ratio of $W(OCH_2CH_2OCH_3)_6$ to acetylacetone in step (2) was adjusted to 1:3.1.

Comparative Example 7

Implementation of this comparative example was the same as that of Example 12 except that the molar ratio of water to total metal elements in step (3) was adjusted to 1.4:1.

Comparative Example 8

Implementation of this comparative example was the same as that of Example 16 except that the molar ratio of water to total metal elements in step (3) was adjusted to 0.7:1.

Comparative Example 9

Implementation of this comparative example was the same as that of Example 14 except that the atmospheric distillation in step (3) used to obtain the metal copolymer was substituted with reduced pressure distillation.

Experimental Example 18

This experimental example studied the storage stability of the high-entropy ceramic precursors by the following test method. Initial viscosity of the precursors prepared in the examples and comparative examples of the present invention, as well as viscosity of the precursors after being stored at room temperature for 12 months were measured, and a comparative analysis of viscosity change rates was conducted. This experimental example also recorded the morphology and properties of the precursors prepared in the examples and comparative examples during and at the end of the reaction processes, which are shown in the following table.

| Precursors | Initial viscosity (Pa · S) | Viscosity after storage for 12 months (Pa · S) | Viscosity change rate (%) | Morphology and properties |
|---|---|---|---|---|
| Example 10 | 92.5 | 99.7 | 7.8% | A homogeneous and soluble copolymer was formed. |
| Example 11 | 92.3 | 97.9 | 6.15% | A homogeneous and soluble copolymer was formed. |
| Example 12 | 94.1 | 100.0 | 6.3% | A homogeneous and soluble copolymer was formed. |
| Example 13 | 91.7 | 95.2 | 3.8% | A homogeneous and soluble copolymer was formed. |
| Example 14 | 90.6 | 93.9 | 3.7% | A homogeneous and soluble copolymer was formed. |
| Example 15 | 89.4 | 91.5 | 2.4% | A homogeneous and soluble copolymer was formed. |
| Example 16 | 89.9 | 91.9 | 2.3% | A homogeneous and soluble copolymer was formed. |
| Example 17 | 96.0 | 103.1 | 7.4% | A homogeneous and soluble copolymer was formed. |
| Comparative Example 5 | 100.1 | — | — | The system gelled after 5 months, and the viscosity could not be measured. |
| Comparative Example 6 | — | — | — | Partial precipitation occurred, and a homogeneous and soluble copolymer could not be formed. |
| Comparative Example 7 | — | — | — | Partial precipitation occurred, and a homogeneous and soluble copolymer |

-continued

| Precursors | Initial viscosity (Pa · S) | Viscosity after storage for 12 months (Pa · S) | Viscosity change rate (%) | Morphology and properties |
|---|---|---|---|---|
| | | | | could not be formed. |
| Comparative Example 8 | 98.6 | — | — | The system gelled after 4 months, and the viscosity could not be measured. |
| Comparative Example 9 | 90.8 | 130 | 43.2% | A homogeneous and soluble copolymer was formed. |

As can be seen from the above table, the precursors provided in Examples 10 to 17 of the present invention are all metal-containing copolymers exhibiting uniform element distribution and easily soluble in conventional organic reagents. In each of Comparative Examples 5 and 6, the ratio of the metal alkoxide to the complexing agent is adjusted. When the complexing agent is used in a relatively low content, the rate of the subsequent hydrolysis reaction is relatively fast, and precipitation occurs during the reaction, making it impossible to obtain a soluble precursor with uniform elements distribution. When the complexing agent is used in a relatively high content, the rate of the hydrolysis is so slow that the reaction is incomplete, causing residual of a large number of alkoxy groups, which leads to instability of the precursor and therefore gelation during storage thereof. Similarly, in each of Comparative Examples 7 and 8, the proportion of water in the hydrolysis process is adjusted compared with that in the examples, making the hydrolysis reaction too fast or incomplete, thus making it impossible to prepare a precursor having uniform element distribution and suitable for long-term storage.

In Comparative Example 9, distillation method used in the hydrolysis process is adjusted by substituting the atmospheric distillation with reduced pressure distillation. In atmospheric distillation process, the polymer precursor may further undergo post-polymerization during the distillation process, which may further reduce excess hydroxyl groups generated by the hydrolysis reaction in the system, thereby improving the storage stability of the precursor. The inventors found that the viscosity change rate of precursor prepared by atmospheric distillation is significantly smaller than that prepared by reduced pressure distillation, and therefore atmospheric distillation is more suitable for producing precursors with good storage properties.

Example 19

In this example, a high-entropy carbide ceramic fiber is prepared using the following methods.

(1) Preparation of spinnable precursor solution: The high-entropy carbide ceramic precursor comprising Ti, Hf, Nb, Ta, and Mo was prepared by the method described in Example 8. 30 g high-entropy carbide ceramic precursor, 10 g polyvinylpyrrolidone, and 300 g ethanol were mixed under stirring to obtain a brown homogenous solution.

(2) Spinning and collection: Compressed air was used as a gas source. The precursor solution obtained in step (1) was stretched into a nanofiber using a blow spinning device at a spinning pressure of 0.09 MPa, with a feeding speed being 50 mL/h, and a collecting distance being 50 cm.

(3) Pyrolyzation: The nanofiber collected in step (2) was placed in a heat treatment device, and heated to 500° C. at a heating rate of 1° C./min under a nitrogen atmosphere, and kept at the temperature for 2 hours to obtain a pyrolyzed fiber.

(4) High-temperature solid solution: The pyrolyzed fiber prepared in step (3) was placed in a heat treatment device, and solutionized at 1600° C. under vacuum for 2 hours to obtain a high-entropy carbide fiber.

Figure 17:
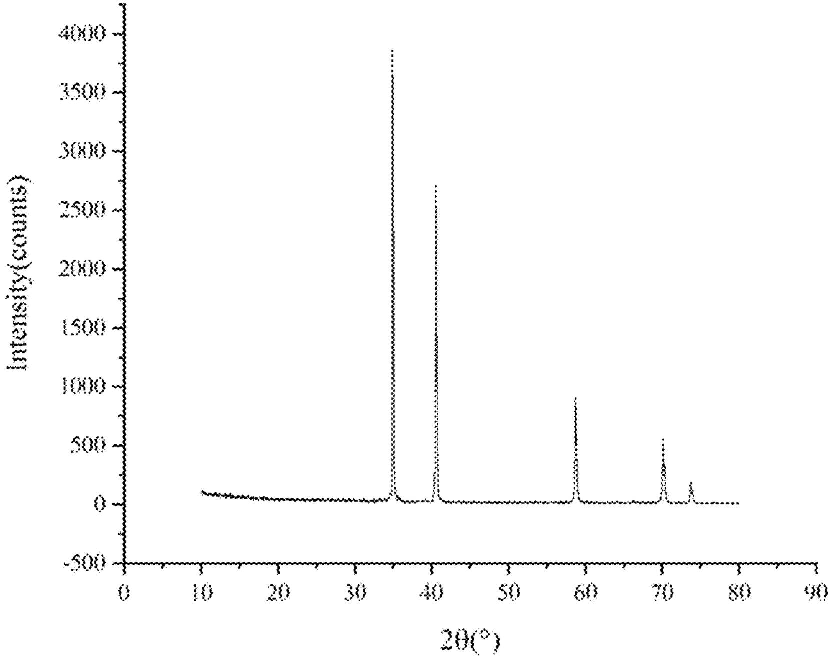
FIG. 17 is an XRD pattern of a fiber obtained in Example 19 of the present invention.
Figure 18:
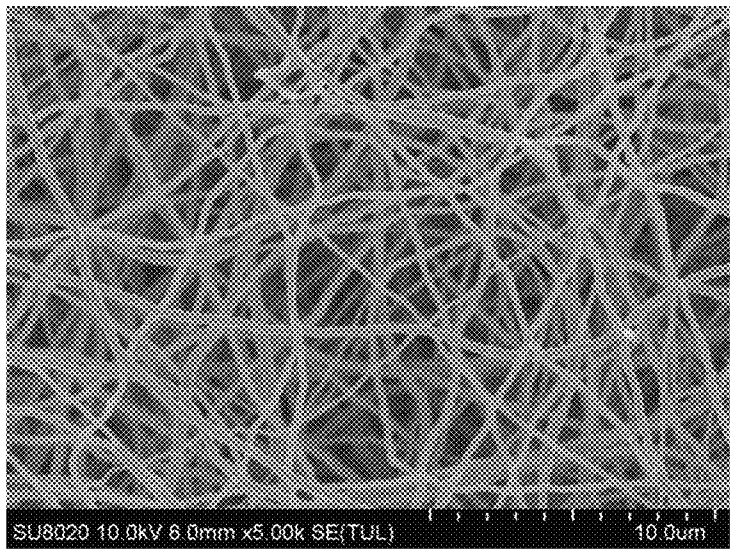
FIG. 18 is a SEM image of the fiber obtained in Example 19 of the present invention.

The XRD pattern of the high-entropy carbide fiber is shown in FIG. 17, and a SEM image thereof is shown in FIG. 18.

Example 20

In this example, a high-entropy carbide ceramic fiber is prepared using the following methods.

A high-entropy carbide ceramic precursor comprising Ti, Hf, Nb, Ta, and W was prepared as follows.

(1) Obtaining metal alkoxides: Metal alkoxides $Ti(OPr)_4$, $Hf(Oi\text{-}Pr)_4$, $Ta(OCH_2CH_2OCH_3)_5$, $Nb(OPr)_5$, and $W(OCH_2CH_2OCH_3)_6$ were obtained. Among them, $Hf(Oi\text{-}Pr)_4$, $Ta(OCH_2CH_2OCH_3)_5$, $Nb(OPr)_5$, and $W(OCH_2CH_2OCH_3)_6$ were prepared by the method descried in Example 5.

(2) Preparation of metal alkoxide complexes: Acetylacetone was added dropwise into each of the metal alkoxides $Hf(Oi\text{-}Pr)_4$, $Ti(OPr)_4$, $Ta(OCH_2CH_2OCH_3)_5$, $Nb(OPr)_5$, and $W(OCH_2CH_2OCH_3)_6$ at room temperature, followed by stirring for 1 hour. Molar ratios of the metal alkoxides $Hf(Oi\text{-}Pr)_4$, $Ti(OPr)_4$, $Ta(OCH_2CH_2OCH_3)_5$, $Nb(OPr)_5$, and $W(OCH_2CH_2OCH_3)_6$ to acetylacetone were 1:0.6, 1:1, 1:1.5, 1:2.5, and 1:0.9, respectively.

(3) Cohydrolysis: The metal alkoxide complexes prepared in step (2) were uniformly mixed in an equal metal molar ratio. A mixture of water and n-propanol was added dropwise into the system at 70° C., a molar ratio of water to total metal elements being 1.3:1, and a mass ratio of n-propanol to water being 8:1. Then, refluxing was performed for 1 hour, followed by atmospheric distillation to obtain a metal alkoxide copolymer.

(4) Preparation of a precursor: The metal alkoxide copolymer prepared in step (3) was uniformly mixed with allyl-functional novolac resin. A ratio of a total molar quantity of metal elements in the metal alkoxide copolymer to a mass of the allyl-functional novolac resin was 1 mol:20 g. The resultant mixture was heated to 80° C. and reacted for 1 hour, and then cooled to obtain a high-entropy carbide ceramic polymer precursor.

(5) Preparation of a spinnable precursor solution: 30 g of the above high-entropy carbide ceramic precursor, 6 g polyvinyl butyral, and 280 g n-propanol were mixed under stirring to obtain a brown homogenous solution.

(6) Spinning and collection: Compressed nitrogen was used as a gas source. The precursor solution obtained in step (5) was stretched into a nanofiber using a blow spinning device at a spinning pressure of 0.06 MPa, with a feeding speed being 30 mL/h, and a collecting distance being 40 cm.

(7) Pyrolyzation: The nanofiber collected in step (6) was placed in a heat treatment device, heated to 600° C. at a heating rate of 1.5° C./min under an argon atmosphere, and kept at the temperature for 2 hours to obtain a pyrolyzed fiber.

(8) High-temperature solutionizing: The pyrolyzed fiber prepared in step (7) was placed in a heat treatment device, and solutionized at a high temperature of 1600° C. under vacuum for 2 hours to obtain a high-entropy carbide fiber.

Figure 19:
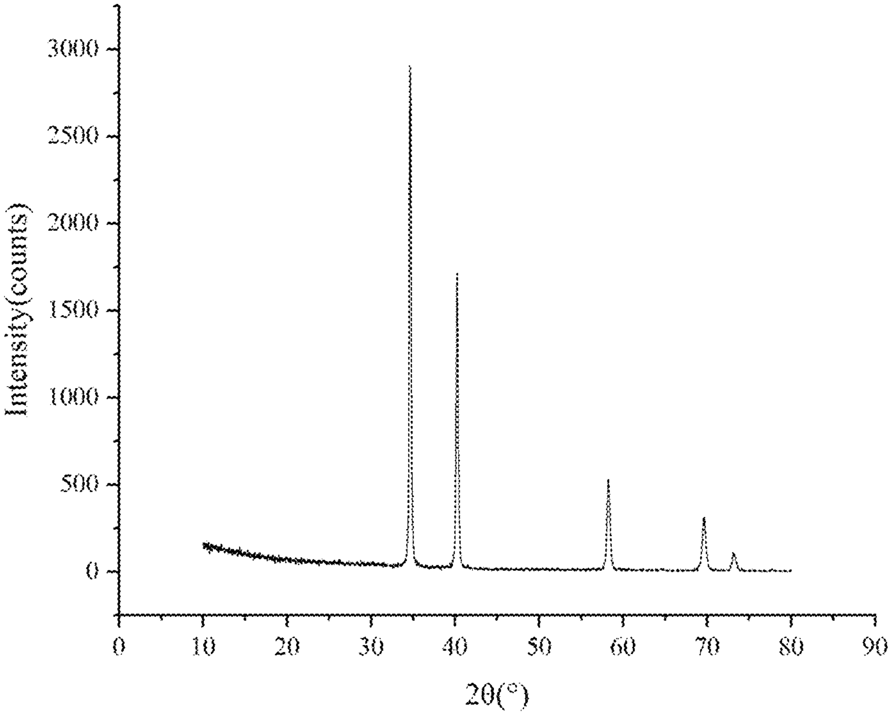
FIG. 19 is an XRD pattern of a fiber obtained in Example 20 of the present invention.
Figure 20:
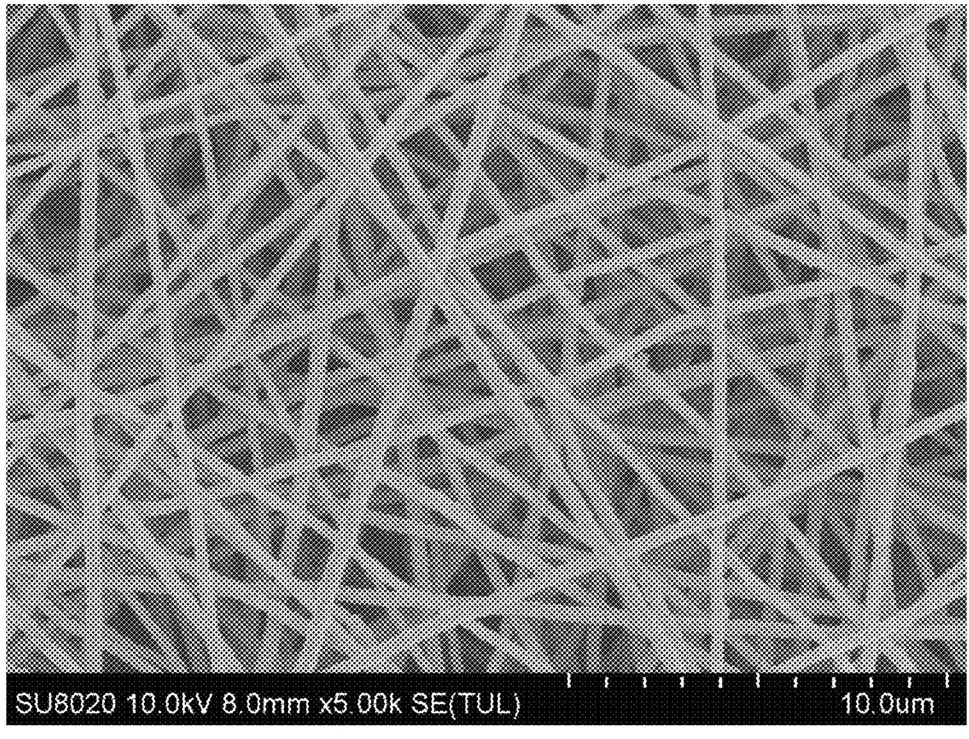
FIG. 20 is a SEM image of the fiber obtained in Example 20 of the present invention.

The XRD pattern of the high-entropy carbide fiber is shown in FIG. 19, and a SEM image thereof is shown in FIG. 20.

Example 21

In this example, a high-entropy carbide ceramic fiber is prepared using the following methods.

(1) Preparation of a spinnable precursor solution: A high-entropy carbide ceramic precursor comprising Zr, Hf, Ti, and Ta was prepared by the method described in Example 3. 30 g high-entropy carbide ceramic precursor, 10 g polyvinyl acetate, and 290 g ethylene glycol methyl ether were mixed under stirring to obtain a brown homogenous solution.

(2) Spinning and collection: The precursor solution obtained in step (1) was stretched into a nanofiber using an electrospinning device at a spinning voltage of 10 kV, with a feeding speed being 30 mL/h, and a collecting distance being 45 cm.

(3) Pyrolyzation: The nanofiber collected in step (2) was placed in a heat treatment device, heated to 600° C. at a heating rate of 1° C./min under a nitrogen atmosphere, and kept at the temperature for 2 hours to obtain a pyrolyzed fiber.

(4) High-temperature solutionizing: The pyrolyzed fiber prepared in step (3) was placed in a heat treatment device, and solutionized at a high temperature of 1800° C. under vacuum for 1 hour to obtain a high-entropy carbide fiber.

Example 22

In this example, a high-entropy carbide ceramic fiber is prepared using the following methods.

(1) Preparation of a spinnable precursor solution: A high-entropy carbide ceramic precursor comprising Zr, Hf, Ti, Ta, Mo, and W was prepared by the method described in Example 4. 30 g high-entropy carbide ceramic precursor, 15 g of polymethyl methacrylate, and 600 g ethanol were mixed under stirring to obtain a brown homogenous solution.

(2) Spinning and collection: The precursor solution obtained in step (1) was stretched into a nanofiber using an electrospinning device at a spinning voltage of 15 kV, with a feeding speed being 30 mL/h, and a collecting distance being 40 cm.

(3) Pyrolyzation: The nanofiber collected in step (2) was placed in a heat treatment device, heated to 600° C. at a heating rate of 1.5° C./min under a helium atmosphere, and kept at the temperature for 2 hours to obtain a pyrolyzed fiber.

(4) High-temperature solutionizing: The pyrolyzed fiber prepared in step (3) was placed in a heat treatment device, and solutionized at a temperature of 1700° C. under an argon atmosphere for 2 hours to obtain a high-entropy carbide fiber.

Example 23

In this example, a high-entropy carbide ceramic fiber is prepared using the following methods.

(1) Preparation of a spinnable precursor solution: A high-entropy carbide ceramic precursor comprising Zr, Hf, Ti, Ta, Nb, and W was prepared by the method described in Example 5. 30 g high-entropy carbide ceramic precursor, 12 g polyvinyl butyral, and 180 g n-propanol were mixed under stirring to obtain a brown homogenous solution.

(2) Spinning and collection: The precursor solution obtained in step (1) was stretched into a fiber using a centrifugal spinning device at a rotation speed of 1000 r/min, with a collecting distance being 40 cm.

(3) Pyrolyzation: The nanofiber collected in step (2) was placed in a heat treatment device, heated to 600° C. at a heating rate of 1.5° C./min under a nitrogen atmosphere, and kept at the temperature for 2 hours to obtain a pyrolyzed fiber.

(4) High-temperature solutionizing: The pyrolyzed fiber prepared in step (3) was placed in a heat treatment device, and solutionized at a temperature of 2000° C. under an argon atmosphere for 0.5 hour to obtain a high-entropy carbide fiber.

Example 24

In this example, a high-entropy carbide ceramic fiber is prepared using the following methods.

(1) Preparation of a spinnable precursor solution: A high-entropy carbide ceramic precursor comprising Zr, Hf, Ti, Ta, Nb, Mo, and W was prepared by the method described in Example 6. 30 g high-entropy carbide ceramic precursor, 3 g polyvinyl butyral, and 180 g ethylene glycol methyl ether were mixed under stirring to obtain a brown homogenous solution.

(2) Spinning and collection: The precursor solution obtained in step (1) was stretched into a nanofiber using a centrifugal spinning device at a rotation speed of 1500 r/min, with a collecting distance being 30 cm.

(3) Pyrolyzation: The nanofiber collected in step (2) was placed in a heat treatment device, heated to 600° C. at a heating rate of 2° C./min under an argon atmosphere, and kept at the temperature for 2 hours to obtain a pyrolyzed fiber.

(4) High-temperature solutionizing: The pyrolyzed fiber prepared in step (3) was placed in a heat treatment device, and solutionized at a high temperature of 2000° C. under an argon atmosphere for 0.5 hour to obtain a high-entropy carbide fiber.

Example 25

In this example, a high-entropy carbide ceramic fiber is prepared using the following methods.

(1) Preparation of a spinnable precursor solution: A high-entropy carbide ceramic precursor comprising Ti, Hf, Nb, Ta, and Mo was prepared by the method described in Example 8. 30 g high-entropy carbide ceramic precursor, 6 g polyvinyl butyral, 4 g polyvinylpyrrolidone, and 300 g N,N-dimethylformamide were mixed under stirring to obtain a brown homogenous solution.

(2) Spinning and collection: Compressed argon was used as a gas source. The precursor solution obtained in step (1) was stretched into a nanofiber using a blow spinning device at a spinning pressure of 0.02 MPa, with a feeding speed being 10 mL/h, and a collecting distance being 10 cm.

(3) Pyrolyzation: The nanofiber collected in step (2) was placed in a heat treatment device, heated to 550° C. at a heating rate of 0.5° C./min under a nitrogen atmosphere, and kept at the temperature for 4 hours to obtain a pyrolyzed fiber.

(4) High-temperature solutionizing: The pyrolyzed fiber prepared in step (3) was placed in a heat treatment device, and solutionized at a high temperature of 1400° C. under vacuum for 5 hours to obtain a high-entropy carbide fiber.

Example 26

In this example, a high-entropy carbide ceramic fiber is prepared using the following methods.

(1) Preparation of a spinnable precursor solution: A high-entropy carbide ceramic precursor comprising Ti, Hf, Nb, Ta, and W was prepared by the method described in Example 20. 30 g high-entropy ceramic precursor, 1 g polyvinyl acetatel, 5 g polyvinyl butyral, and 280 g tert-butyl methyl ether were mixed under stirring to obtain a brown homogenous solution.

(2) Spinning and collection: Compressed nitrogen was used as a gas source. The precursor solution obtained in step (1) was stretched into a nanofiber using a blow spinning device at a spinning pressure of 0.02 MPa, with a feeding speed being 60 mL/h, and a collecting distance being 50 cm.

(3) Pyrolyzation: The nanofiber collected in step (2) was placed in a heat treatment device, heated to 600° C. at a heating rate of 3.5° C./min under an argon atmosphere, and kept at the temperature for 3 hours to obtain a pyrolyzed fiber.

(4) High-temperature solutionizing: The pyrolyzed fiber prepared in step (3) was placed in a heat treatment device, and solutionized at a high temperature of 1500° C. under vacuum for 4 hours to obtain a high-entropy carbide fiber.

Example 27

In this example, a high-entropy carbide ceramic fiber is prepared using the following methods.

(1) Preparation of a spinnable precursor solution: A high-entropy carbide ceramic precursor comprising Zr, Hf, Ti, and Ta was prepared by the method described in Example 3. 30 g high-entropy ceramic precursor, 7 g polymethyl methacrylate, 3 g polyvinyl acetate, 200 g ethylene glycol methyl ether, and 90 g ethanol were mixed under stirring to obtain a brown homogenous solution.

(2) Spinning and collection: The precursor solution obtained in step (1) was stretched into a nanofiber using an electrospinning device at a spinning voltage of 5 kV, with a feeding speed being 10 mL/h, and a collecting distance being 10 cm.

(3) Pyrolyzation: The nanofiber collected in step (2) was placed in a heat treatment device, heated to 500° C. at a heating rate of 2.5° C./min under a nitrogen atmosphere, and kept at the temperature for 2 hours to obtain a pyrolyzed fiber.

(4) High-temperature solutionizing: The pyrolyzed fiber prepared in step (3) was placed in a heat treatment device, and solutionized at a high temperature of 1600° C. under vacuum for 1.5 hours to obtain a high-entropy carbide fiber.

Example 28

In this example, a high-entropy carbide ceramic fiber is prepared using the following methods.

(1) Preparation of a spinnable precursor solution: A high-entropy carbide ceramic precursor comprising Zr, Hf, Ti, Ta, Mo, and W was prepared by the method described in Example 4. 30 g high-entropy carbide ceramic precursor, 15 g polymethyl methacrylate, 100 g ethanol, and 80 g ethylene glycol methyl ether were mixed under stirring to obtain a brown homogenous solution.

(2) Spinning and collection: The precursor solution obtained in step (1) was stretched into a nanofiber using an electrospinning device at a spinning voltage of 10 kV, with a feeding speed being 60 mL/h, and a collecting distance being 50 cm.

(3) Pyrolyzation: The nanofiber collected in step (2) was placed in a heat treatment device, heated to 600° C. at a heating rate of 2° C./min under a helium atmosphere, and kept at the temperature for 3 hours to obtain a pyrolyzed fiber.

(4) High-temperature solutionizing: The pyrolyzed fiber prepared in step (3) was placed in a heat treatment device, and solutionized at a temperature of 1700° C. under a helium atmosphere for 2 hours to obtain a high-entropy carbide fiber.

Example 29

In this example, a high-entropy carbide ceramic fiber is prepared using the following methods.

(1) Preparation of a spinnable precursor solution: A high-entropy carbide ceramic precursor comprising Zr, Hf, Ti, Ta, Nb, and W was prepared by the method described in Example 5. 30 g high-entropy ceramic precursor, 12 g polyvinyl butyral, 120 g n-propanol, 60 g acetone were mixed under stirring to obtain a brown homogenous solution.

(2) Spinning and collection: The precursor solution obtained in step (1) was stretched into a fiber using a centrifugal spinning device at a rotation speed of 500 r/min, with a collecting distance being 20 cm.

(3) Pyrolyzation: The nanofiber collected in step (2) was placed in a heat treatment device, heated to 600° C. at a heating rate of 1.5° C./min under a nitrogen atmosphere, and kept at the temperature for 2 hours to obtain a pyrolyzed fiber.

(4) High-temperature solutionizing: The pyrolyzed fiber prepared in step (3) was placed in a heat treatment device, and solutionized at a temperature of 2000° C. under an argon atmosphere for 0.5 hour to obtain a high-entropy carbide fiber.

Example 30

In this example, a high-entropy carbide ceramic fiber is prepared using the following methods.

(1) Preparation of a spinnable precursor solution: A high-entropy carbide ceramic precursor comprising Zr, Hf, Ti, Ta, Nb, Mo, W was prepared by the method described in Example 6. 30 g high-entropy ceramic precursor, 30 g polyvinyl butyral, and 300 g ethylene glycol methyl ether were mixed under stirring to obtain a brown homogenous solution.

(2) Spinning and collection: The precursor solution obtained in step (1) was stretched into a nanofiber using a centrifugal spinning device at a rotation speed of 5000 r/min, with a collecting distance being 100 cm.

(3) Pyrolyzation: The nanofiber collected in step (2) was placed in a heat treatment device, heated to 600° C. at a heating rate of 2° C./min under a nitrogen atmosphere, and kept at the temperature for 2 hours to obtain a pyrolyzed fiber.

(4) High-temperature solutionizing: The pyrolyzed fiber prepared in step (3) was placed in a heat treatment device, and solutionized at a high temperature of 2000° C. under an argon atmosphere for 0.5 hour to obtain a high-entropy carbide fiber.

Comparative Example 10

This comparative example was the same as Example 20 except that the adding amount of the spinning aid polyvinylpyrrolidonein step (1) was adjusted to 32 g. Morphology of the obtained fiber is shown in FIG. 21.

Figure 21:
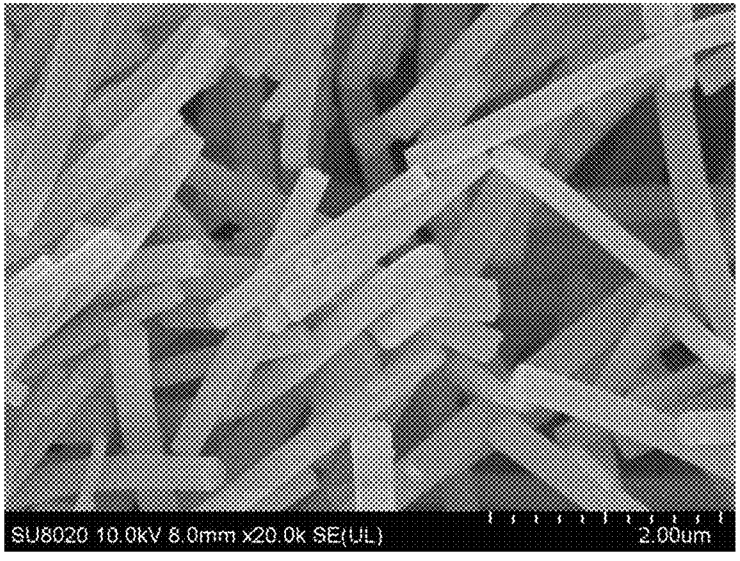
FIG. 21 is a SEM image of a fiber obtained in Comparative Example 10 of the present invention.

As can be seen from the morphology of the fibers in FIG. 21, the fibers prepared in Comparative Example 10 exhibit relatively uniform morphology but are short in length, which limits applications thereof. The reason is that when the amount of the spinning aid exceeds a certain level, the amount of the precursor in the green fibers would be relatively lower, and as the spinning aid leaves the system during the pyrolyzation, the lack of precursor leads to breakage of the fibers.

Comparative Example 11

Figure 22:
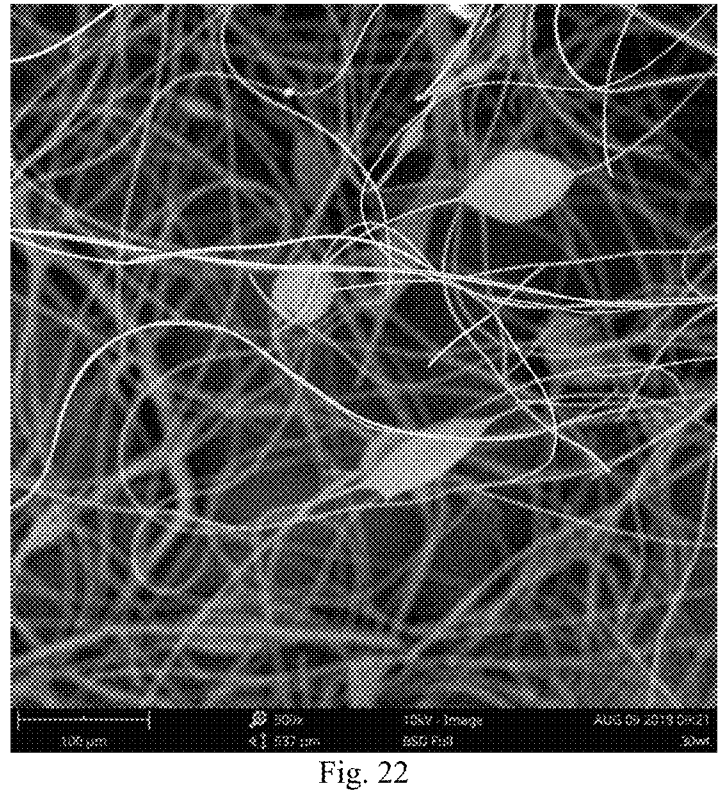
FIG. 22 is a SEM image of a fiber obtained in Comparative Example 11 of the present invention.

This comparative example was the same as Example 19 except that the spinning aid in step (1) was removed, and the spinnable precursor solution was prepared only with the high-entropy carbide ceramic precursor and the solvent. Morphology of the obtained fiber is shown in FIG. 22.

As can be seen from the morphology of the fibers in FIG. 21, the fibers prepared in Comparative Example 11 are not uniform in thickness and have shots in some parts thereof. This is because the spinning aid is removed in Comparative Example 11, leading to insufficient entanglement of the precursor in the spinnable precursor solution. The spinnable solution is further subjected to a drafting force during the spinning process, in which case the entanglement is destroyed, resulting in the generation of shots.

INDUSTRIAL APPLICATION

The present invention brings the follow beneficial effects.

1. The present invention prepares high-entropy carbide ceramics from polymer precursors. The polymer precursors demonstrate molecular-level uniform dispersion of elements. The uniform distribution of elements maintained during the curing and pyrolysis processes is conducive to realizing homogenous elements distribution of the carbide solid solution, as a consequence of which a completely chemically uniform solid solution can be obtained at a relatively low temperature (1700° C.) without any high pressure. This method can be used to prepare not only high-entropy carbide ceramics with low entropy-forming ability, such as $HfNbTaTiWC_5$, $HfTaTiWZrC_5$, $HfMoTaWZrC_5$, etc., but also six-element, seven-element, and eight-element high-entropy carbide ceramics that have not been reported in the literature.

2. The present invention prepares rare earth element-containing high-entropy carbide ceramics from polymer precursors. The polymer precursors demonstrate molecular-level uniform dispersion of elements. The uniform distribution of elements and short-range distribution of atoms maintained during the curing and pyrolysis processes are conducive to solid solution process and obtain solid solution with homogenous element distribution, as a consequence of which even an element with a relatively large difference in atomic radii can be utilized to obtain a completely chemically uniform solid solution at a relatively low temperature (1700° C.) without any high pressure.

3. The present invention prepares high-entropy carbide ceramic fibers for the first time from high-entropy carbide ceramic polymer precursors, which comprising at least four metal elements selected from Ti, Zr, Hf, V, Nb, Ta, Mo, and W, and the molar quantity of each metal element accounts for 5-35% of the total molar quantity of the metal elements. The spinning method can be blowing spinning, electrospinning, or centrifugal spinning.

4. The spinnable high-entropy ceramic precursor solutions provided by the present invention have adjustable rheological properties, which improves spinning property. The spinning solutions can be stored with seal at room temperature for over 3 weeks, which further improves the spinning efficiency.

5. The present invention prepares high-entropy ceramic fibers by blowing spinning, electrospinning, or centrifugal spinning, which requires simple equipment, is convenient to operate, and can be realized at low costs. Continuous fiber cotton or non-woven fabric with controllable average diameters can be obtained, and rapid scale-up production can be achieved.

The invention claimed is:

1. A method for preparing the high-entropy carbide ceramic precursor comprising steps of:

(1) obtaining metal alkoxide complexes: adding dropwise a complexing agent into metal alkoxides $M(OR)_n$, followed by stirring for 0.1-5 hours to obtain the metal alkoxide complexes;

(2) cohydrolysis: selecting at least four metal alkoxide complexes comprising different metal elements prepared according to step (1), and mixing the same uniformly, followed by dropwise adding of a mixture of water and a monohydric alcohol, refluxing for 1-5 hours, and then atmospheric distillation to obtain a first metal alkoxide copolymer; or, selecting at least four transition metal alkoxide complexes comprising different metal elements prepared according to step (1), and mixing the same uniformly with a rare earth element-containing compound, followed by dropwise adding of a mixture of water and a monohydric alcohol into the resulted system at a temperature ranging from room temperature to 90° C., refluxing for 1-5 hours, and then atmospheric distillation to obtain a second metal alkoxide copolymer; and (3) preparing the precursor: mixing the first metal alkoxide copolymer or the second metal alkoxide copolymer prepared in step (2) uniformly with allyl-functional novolac resin, followed by heating to 50-90° C. for 0.5-4 hours, and then cooling to obtain the high-entropy carbide ceramic precursor or the rare earth-containing high-entropy carbide ceramic precursor.

2. The method for preparing the high-entropy carbide ceramic precursor according to claim 1, wherein in step (1), a molar ratio of each metal alkoxide to the complexing agent is 1:(0.15-0.5)n; when M in the metal alkoxides is selected from Ti, Zr, and Hf, n is 4; when M in the metal alkoxides is selected from V, Nb, Ta, and Mo, n is 5; when M is W, n is 6; and the complexing agent is acetylacetone and/or ethyl acetoacetate.

3. The method for preparing the high-entropy carbide ceramic precursor according to claim 2, wherein in step (2), a molar ratio of water to total metal elements is 0.8-1.3:1; a mass ratio of the monohydric alcohol to water is 3-8:1; and the monohydric alcohol is one or more selected from methanol, ethanol, isopropanol, n-propanol, n-butanol, isobutanol, ethylene glycol methyl ether, and ethylene glycol ethyl ether.

4. The method for preparing the high-entropy carbide ceramic precursor according to claim 3, wherein in step (3), a ratio of the total molar quantity of metal elements in the metal alkoxide copolymer to the mass of the allyl-functional novolac resin is 1 mol:13-15 g or 1 mol:18-20 g.

5. The method for preparing the high-entropy carbide ceramic precursor according to claim 1, wherein when M in the metal alkoxides is selected from Hf, V, Nb, Ta, Mo, and W, the metal alkoxides in step (1) are prepared by reacting a metal salt with a monohydric alcohol as follows: dispersing the metal salt $MCl_n$ or $M(NO_3)_n$ in a solvent, followed by dropwise adding monohydric alcohol at −10 to 5° C. and then adding dropwise triethylamine to obtain a mixture, which is then refluxed for 1-5 hours and filtered to obtain a metal alkoxide solution, wherein a ratio of the metal salt to the monohydric alcohol to triethylamine is 1:(1-2)n:(1-1.5) n; the solvent is one or more selected from n-hexane, n-heptane, toluene, xylene, ethylene glycol dimethyl ether, ethylene glycol diethyl ether, and tert-butyl methyl ether; and the monohydric alcohol is one or more selected from methanol, ethanol, isopropanol, n-propanol, n-butanol, isobutanol, ethylene glycol methyl ether, and ethylene glycol ethyl ether.

6. The method for preparing the high-entropy carbide ceramic precursor according to claim 1, wherein in step (1), the complexing agent is added dropwise into the metal alkoxides $M(OR)_n$ at a temperature ranging from room temperature to 80° C., and in step (2), the mixture of water and the monohydric alcohol is added dropwise into a system of the various mixed metal alkoxide complexes at a temperature ranging from room temperature to 90° C.

7. The method for preparing the high-entropy carbide ceramic precursor according to claim 1, wherein in step (2), the rare earth element-containing compound is at least one selected from yttrium acetylacetonate and lanthanum acetylacetonate.

8. The method for preparing the high-entropy carbide ceramic precursor according to claim 7, wherein step (2), before mixing the rare earth element-containing compound with the transition metal alkoxide complexes, further comprises adding a monohydric alcohol to the rare earth element-containing compound, followed by refluxing for 0.5-5 hours, wherein a molar ratio of the monohydric alcohol to the rare earth element-containing compound is 5-10:1, and the monohydric alcohol is one or more selected from methanol, ethanol, isopropanol, n-propanol, n-butanol, isobutanol, ethylene glycol methyl ether, and ethylene glycol ethyl ether.

* * * * *